US012595064B2

(12) United States Patent
Raybern

(10) Patent No.: US 12,595,064 B2
(45) Date of Patent: Apr. 7, 2026

(54) SWIVEL LOCKING MECHANISM FOR AIRCRAFT SEAT

(71) Applicant: Textron Innovations Inc., Providence, RI (US)

(72) Inventor: Blake David Raybern, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 176 days.

(21) Appl. No.: 18/480,140

(22) Filed: Oct. 3, 2023

(65) Prior Publication Data

US 2025/0108922 A1     Apr. 3, 2025

(51) Int. Cl.
B64D 11/06 (2006.01)
A47C 3/18 (2006.01)

(52) U.S. Cl.
CPC ...... B64D 11/0648 (2014.12); B64D 11/0649 (2014.12); A47C 3/18 (2013.01)

(58) Field of Classification Search
CPC .......... B64D 11/0639; B64D 11/06395; B64D 11/064; B64D 11/0648; B64D 11/0649; A47C 3/18; A61G 15/02; B60N 2/02; B60N 2002/0204; B60N 2/14; B60N 2/933
See application file for complete search history.

(56) References Cited

U.S. PATENT DOCUMENTS

| | | | | |
|---|---|---|---|---|
| 4,969,685 A | * | 11/1990 | Chihaya | A47C 3/18 74/421 A |
| 5,695,250 A | * | 12/1997 | Lin | A47C 3/18 297/340 |
| 6,253,894 B1 | * | 7/2001 | Schumann | F16H 31/002 297/367 R |
| 6,520,583 B1 | * | 2/2003 | Bonk | B60N 2/236 297/367 R |
| 2001/0038223 A1 | * | 11/2001 | Suga | B60N 2/146 296/65.11 |
| 2004/0195886 A1 | * | 10/2004 | Beatty | B60N 2/938 297/344.21 |
| 2014/0062155 A1 | * | 3/2014 | Honma | B60N 2/02246 297/338 |
| 2020/0198499 A1 | * | 6/2020 | Jang | B60N 2/14 |
| 2024/0359598 A1 | * | 10/2024 | Kim | B60N 2/14 |

* cited by examiner

*Primary Examiner* — Gerald L Sung
(74) *Attorney, Agent, or Firm* — Slater Matsil, LLP

(57) ABSTRACT

An aircraft seat includes a base frame; a seat frame rotatably connected to a top side of the base frame, wherein the seat frame is configured to rotate about a vertical axis; an internal gear plate fixedly connected to the base frame, wherein the internal gear plate includes gear teeth arranged around an opening; a guide plate fixedly connected to a bottom side of the seat frame, wherein the guide plate includes a first guide wall and a second guide wall; and a cart attached to the guide plate between the first guide wall and the second guide wall, wherein the cart includes pawl teeth configured to mesh with the gear teeth, wherein the cart is movable along the guide plate to mesh the pawl teeth with a portion of the gear teeth.

20 Claims, 19 Drawing Sheets

30

40

60

40

61

50

A

54

42

42

52

53

40

SWIVEL LOCKING MECHANISM FOR AIRCRAFT SEAT

TECHNICAL FIELD

The present invention relates generally to a system and method for an aircraft seat, and, in particular embodiments, to a system and method for locking the swivel of the aircraft seat.

BACKGROUND

Some aircraft have passenger seats that can swivel (e.g. rotate) in order to allow the passenger to face various directions. A passenger may be able to lock the swivel of the passenger seat in a particular orientation to prevent the passenger seat from swiveling.

SUMMARY

In accordance with an embodiment of the present invention, an aircraft seat includes a base frame; a seat frame rotatably connected to a top side of the base frame, wherein the seat frame is configured to rotate about a vertical axis; an internal gear plate fixedly connected to the base frame, wherein the internal gear plate includes gear teeth arranged around an opening; a guide plate fixedly connected to a bottom side of the seat frame, wherein the guide plate includes a first guide wall and a second guide wall; and a cart attached to the guide plate between the first guide wall and the second guide wall, wherein the cart includes pawl teeth configured to mesh with the gear teeth, wherein the cart is movable along the guide plate to mesh the pawl teeth with a portion of the gear teeth. In an embodiment, the guide walls protrude into the opening. In an embodiment, the cart is attached to the guide plate by a carriage coupled to a rail, wherein the carriage is fixedly connected to the cart and the rail is fixedly connected to the guide plate. In an embodiment, the rail extends in a radial direction from the vertical axis. In an embodiment, the aircraft seat includes a roof plate fixedly connected to the guide walls and a first spring extending from the cart to the roof plate. In an embodiment, the aircraft seat includes a first cam rotatably connected to the guide plate, wherein the cart physically contacts the first cam. In an embodiment, the cart includes a second cam rotatably connected to the cart, wherein a sidewall of the first guide wall includes a groove, wherein a protruding portion of the second cam is within the groove. In an embodiment, the pawl teeth have a vertical thickness that is greater than a vertical thickness of the gear teeth.

In accordance with an embodiment of the present invention, an aircraft seat includes a base plate; a swivel plate configured to rotate relative to the base plate; and a swivel locking system that includes an internal gear plate attached to the base plate; a guide plate attached to the swivel plate; a rail attached to the guide plate; a cart attached to the rail and movable along the rail, wherein a first end of the cart includes a serrated pawl; and a variable-radius cam attached to the guide plate and contacting a second end of the cart, wherein the variable-radius cam is configured to, when the variable-radius cam is rotated, push the second end of the cart such that the serrated pawl contacts the internal gear plate. In an embodiment, the internal gear plate encircles the cart. In an embodiment, the aircraft seat includes a control arm rotatably attached to the guide plate, wherein the control arm is connected to the variable-radius cam by a cable. In an embodiment, the aircraft seat includes a first spring connected to the variable-radius cam and the guide plate. In an embodiment, the serrated pawl includes first teeth and the internal gear plate includes second teeth, wherein the variable-radius cam is configured to, when the variable-radius cam is rotated, push the second end of the cart such that the first plurality of teeth contacts the second plurality of teeth. In an embodiment, the swivel locking system includes a first guide wall at a first side of the cart and a second guide wall at a second side of the cart, wherein the cart is movable with respect to the first guide wall and the second guide wall. In an embodiment, the cart includes protruding cams that protrude into corresponding recesses in the first guide wall.

In accordance with an embodiment of the present invention, a method includes rotating a seat frame of an aircraft seat to a first angle relative to a base frame of the aircraft seat; translating a movable member attached to the seat frame toward second teeth attached to the base frame such that first teeth attached to the movable member mesh with the second teeth, wherein meshing the first teeth with the second teeth locks the seat frame at the first angle; translating the movable member away from the second teeth; and after translating the movable member away from the second teeth, rotating the seat frame to a second angle relative to the base frame. In an embodiment, the second teeth encircle the movable member. In an embodiment, the method includes locking the seat frame at the second angle. In an embodiment, when the seat frame is locked at the first angle, rotating the seat frame generates point forces on opposite sides of the movable member. In an embodiment, translating the moveable member away from the second teeth pulls the movable member using a spring.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
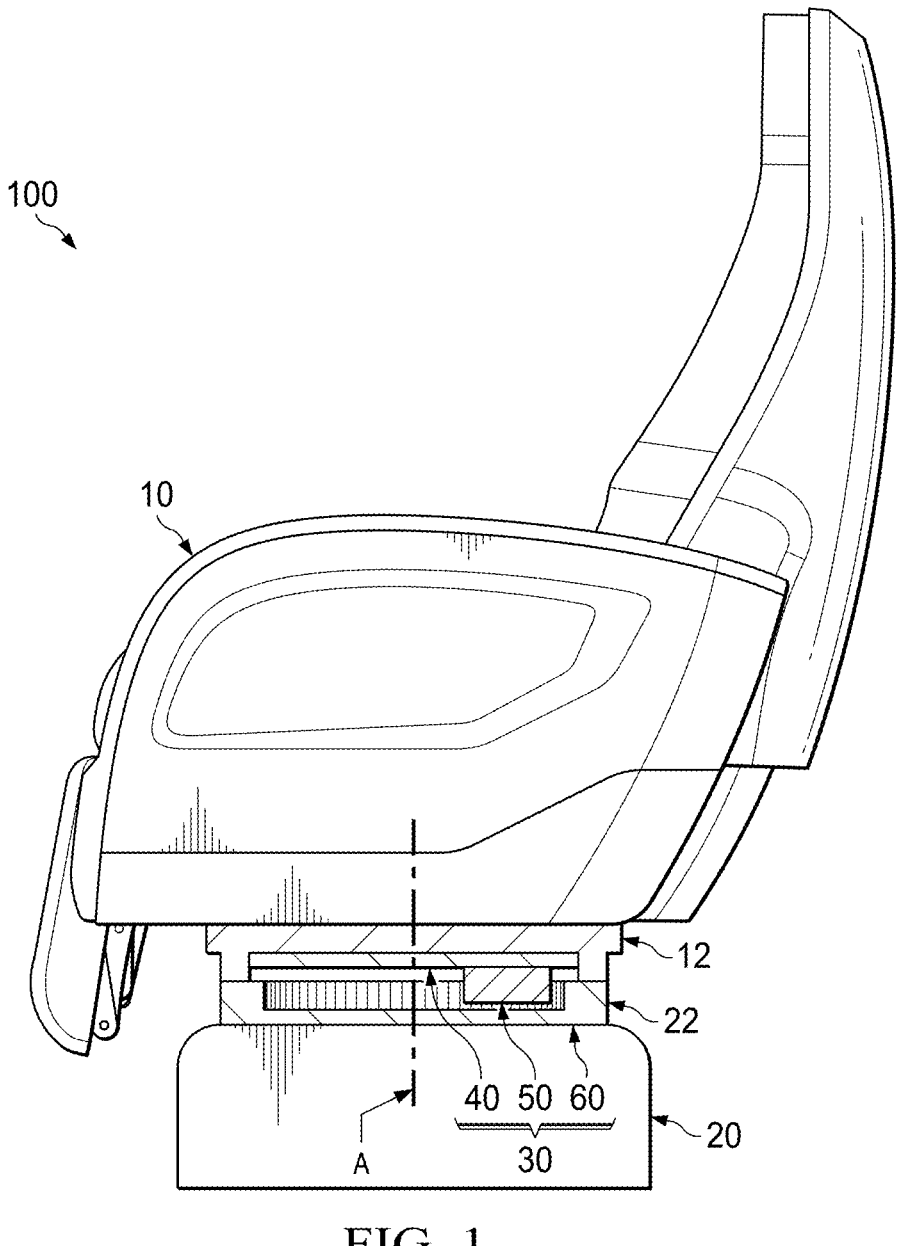
FIG. 1 illustrates an aircraft seat with a swivel locking system, according to some embodiment.

FIG. 1 shows an aircraft seat 100 with swivel locking system 30, in accordance with some embodiments. The seat 100 comprises a seat frame 10, a swivel plate 12 attached to a bottom side of the seat frame 10, a base frame 20, and a base plate 22 attached to a top side of the base frame 20, in accordance with some embodiments. The swivel plate 12 is rotatably coupled to the base plate 22 such that the swivel plate 12 may swivel (e.g., rotate or pivot) relative to the base plate 22 about an axis A. The base frame 20 is attached to the surrounding aircraft (not shown), and thus a passenger may swivel the seat frame 10 to face various directions relative to the orientation of the aircraft. The seat frame 10 may be swiveled a full 360° or a smaller angular range, depending on the configuration or design of the seat 100.

The swivel locking system 30 of the seat 100 comprises a guide plate 40 and a serrated cart 50 attached to the swivel plate 12 and an internal gear plate 60 attached to the base plate 22, in some embodiments. The guide plate 40 is fixedly attached to an underside of the swivel plate 12 and a serrated cart 50 is secured to an underside of the guide plate 40. In this manner, the guide plate 40 and the serrated cart 50 rotate with the rotation of the swivel plate 12. The guide plate 40 may be fixedly attached to the swivel plate 12 using bolts or other suitable fasteners (not shown). The serrated cart 50 is attached to the guide plate 40 such that the serrated cart 50 is movable and may be linearly translated relative to the guide plate 40, described in greater detail below. The internal gear plate 60 is fixedly attached to the base plate 22 such that rotating the swivel plate 12 also rotates the guide plate 40 and the serrated cart 50 relative to the internal gear plate 60. The internal gear plate 60 comprises a plurality of serrations or teeth arranged around the interior of a circular opening, similar to an internal gear. The internal gear plate 60 may be fixedly attached to the base plate 22 using bolts or other suitable fasteners (not shown). The serrated cart 50 protrudes downward into the circular opening of the internal gear plate 60. As described in greater detail below, the serrated cart 50 is configured to engage with the teeth of the internal gear plate 60 to lock the swivel of the swivel plate 12 relative to the base plate 22.

Figure 2:
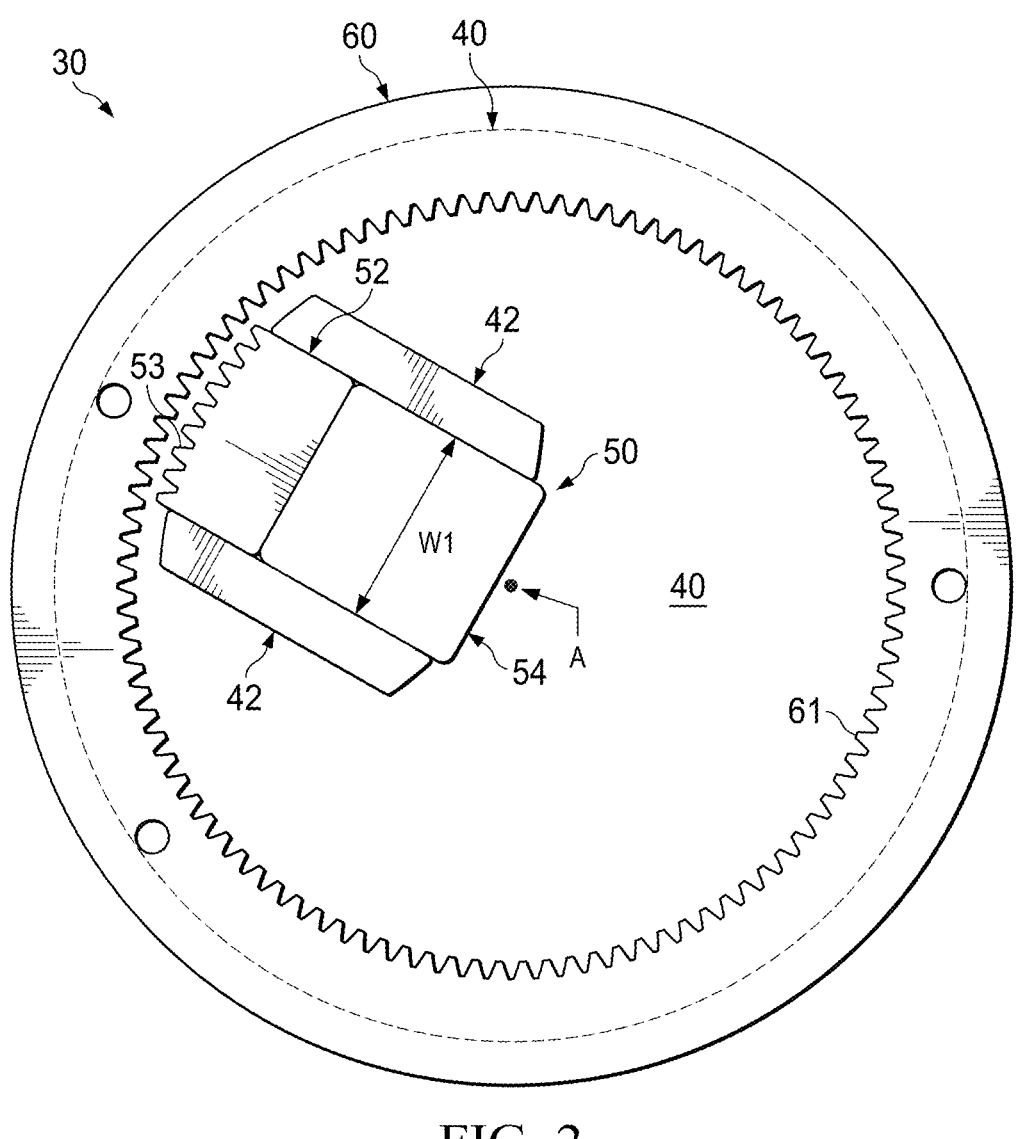
FIG. 2 illustrates a plan view of a swivel locking system of an aircraft seat, in accordance with some embodiments.

FIG. 2 illustrates a swivel locking system 30 of a seat 100, in accordance with some embodiments. FIG. 2 illustrates a plan view of a swivel locking system 30 from below the seat 100 looking upwards. FIG. 2 is intended as an explanatory illustration, and thus some features may have been omitted for clarity. FIG. 2 is intended as an explanatory or representative illustration, and accordingly the various features shown in FIG. 2 may have other dimensions, relative sizes, shapes, arrangements, or configurations, and all such variations are considered within the scope of the present disclosure.

As shown in FIG. 2, the internal gear plate 60 comprises a plurality of gear teeth 61 arranged around a circular opening that is centered on the axis A. The internal gear plate 60 in FIG. 2 has 100 gear teeth, but an internal gear plate 60 may have a different number of gear teeth 61 than shown. In some embodiments, the gear teeth 61 each have a flat end (e.g., a flat "top land"), a length in the range of about 2.3 mm to about 2.5 mm, and/or a profile angle in the range of about 18° to about 22°, though other lengths or angles are possible. The gear teeth 61 may have different sizes, shapes, configurations, or arrangements than shown. The internal gear plate 60 is shown as having a circular outer perimeter, but in other embodiments the outer perimeter may have a different shape. The internal gear plate 60 may have an inner radius (e.g., from the axis A to the gear teeth 61) in the range of about 48 mm to about 50 mm, though other distances are possible. The internal gear plate 60 may have a thickness in the range of about 9 mm to about 11 mm, though other thicknesses are possible.

In the view of FIG. 2, the internal gear plate 60 is in front of the guide plate 40 and obscures the portions of the guide plate 40 that are behind the internal gear plate 60. Accordingly, the outer perimeter of the guide plate 40 is indicated by a dashed line. The guide plate 40 is shown as having a circular outer perimeter, but in other embodiments the outer perimeter may have a different shape. The guide plate 40 comprises two guide walls 42 that protrude from the major surface of the guide plate 40 into the circular opening of the internal gear plate 60. The serrated cart 50 is disposed between the interior surfaces of the guide walls 42, with one guide wall 42 at either side of the serrated cart 50. The guide walls 42 may be separated by a width W1 that is in the range of about 26.5 mm to about 26.7 mm, though other widths are possible. The interior surfaces of the guide walls 42 (e.g., the surfaces facing the serrated cart 50) comprise parallel surfaces that hold the sides of the serrated cart 50 while also allowing the serrated cart 50 to slide back and forth along the parallel direction. Accordingly, the serrated cart 50 may have a width approximately equal to or less than the width W1. In some embodiments, portions of the interior surfaces may be planar, with other portions of the interior surfaces being non-planar. The shapes, lengths, or widths of the two guide walls 42 may be similar or different. The guide walls 42 may be formed as part of a continuous piece with the guide plate 40 or the guide walls 42 may be formed separately and attached to the guide plate 40 using suitable fasteners or another technique. The guide walls 42 may have a height in the range of about 18 mm to about 20 mm, though other heights are possible.

The guide plate 40 is configured to rotate around the axis A with the swivel plate 12, and FIG. 2 illustrates the guide plate 40 rotated to an arbitrary angle with respect to the internal gear plate 60. The outer ends of the guide walls 42 (e.g., the ends farthest from the axis A) are separated from the gear teeth 61 of the internal gear plate 60 such that the guide walls 42 do not contact the gear teeth 61 during rotation of the guide plate 40. Because the gear teeth 61 of the internal gear plate 60 are centered around the axis A, the guide walls 42 remain approximately the same separation distance from the gear teeth 61 as the guide plate 40 is rotated.

The serrated cart 50 comprises a serrated pawl 52 attached to a cart body 54, in accordance with some embodiments. The serrated pawl 52 may be attached to the cart body 54 using, for example, bolts or the like. The serrated pawl 52 and the cart body 54 may be formed as a single piece in other embodiments. The serrated cart 50 has parallel sidewalls that correspond to the interior surfaces of the guide walls 42. In this manner, the guide walls 42 constrain movement of the serrated cart 50 to a linear motion in a direction along a radius from the axis A. The parallel sidewalls may have a width approximately equal to the width W1 (e.g., slightly less than the width W1) The serrated cart 50 may have a length in the range of about 45 mm to about 46 mm, though other lengths are possible. The serrated cart 50 may have a thickness in the range of about 16 mm to about 17 mm, though other thicknesses are possible. The serrated cart 50 or components thereof may have a length or thickness that is greater than, about the same as, or less than the guide walls 42.

As shown in FIG. 2, the outer end of the serrated pawl 52 comprises a plurality of pawl teeth 53. The pawl teeth 53 are arranged along a curved surface corresponding to the gear teeth 61 and curved surface of the internal gear plate 60. In other words, the pawl teeth 53 are configured to securely engage with the gear teeth 61 of the internal gear plate 60, described in greater detail below. In some embodiments, the pawl teeth 53 each have a flat end (e.g., a flat "top land"), and/or have a length in the range of about 2.3 mm to about 2.4 mm, though other lengths are possible. The pawl teeth 53 may be slightly shorter than the true depth of the gear teeth 61, as shown by the gap between arrows G1 in FIG. 5, in order to prevent the pawl teeth 53 from contacting the spaces between the gear teeth 61, which can result in inefficient engagement or meshing. Similarly, the gear teeth 61 may be slightly shorter than the true depth of the pawl teeth 53, as shown by the gap between arrows G2 in FIG. 5. The serrated pawl 52 may have a different number of pawl teeth 53 than shown, or the pawl teeth 53 may have different sizes or shapes than shown.

Figure 3:
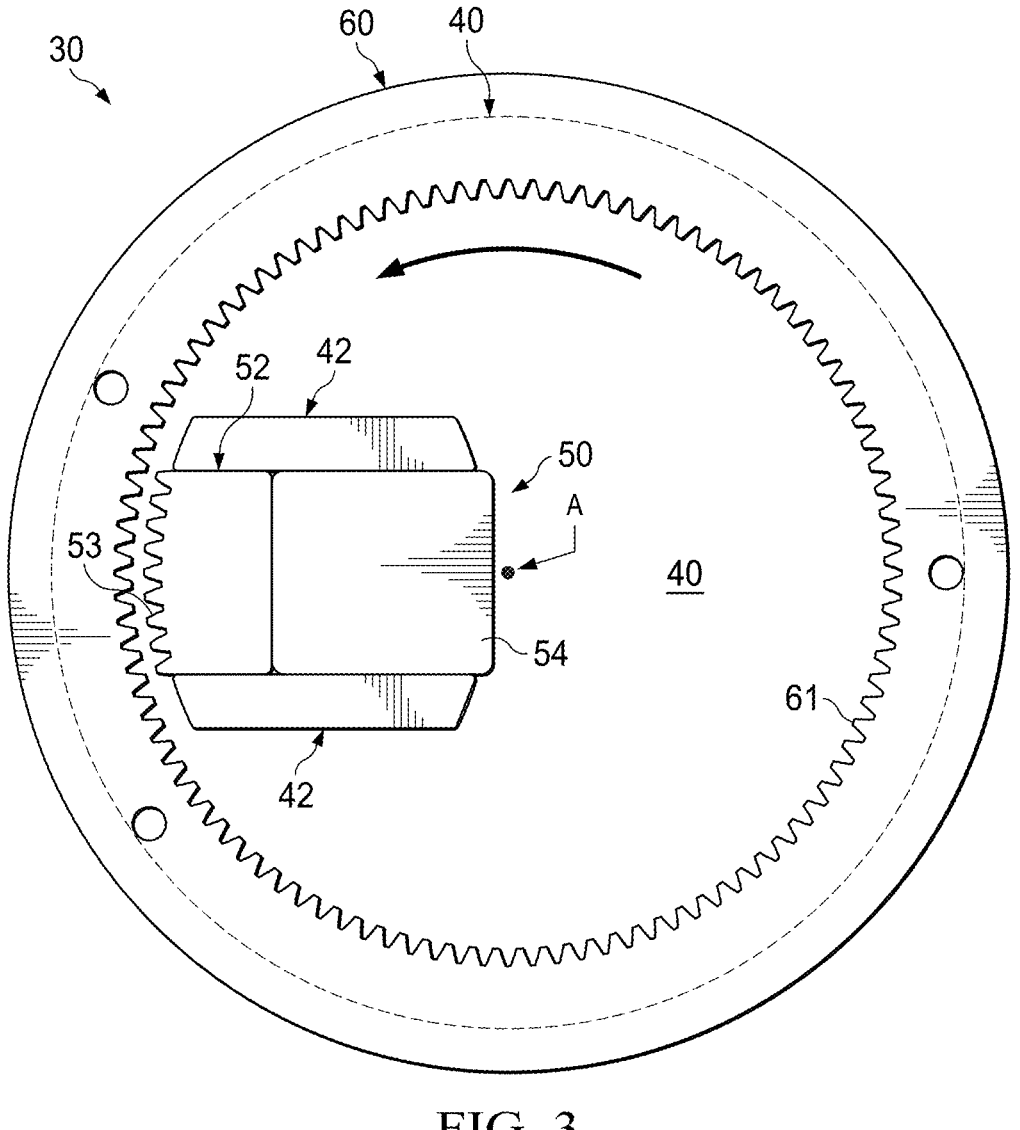
FIG. 3 illustrates a plan view of a swivel locking system in an unlocked state, in accordance with some embodiments.
Figures 4, 8:
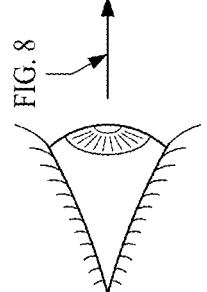
FIG. 4 illustrates a plan view of a swivel locking system in a locked state, in accordance with some embodiments.
FIG. 8 illustrates a side view of a swivel locking system, in accordance with some embodiments.

FIGS. 3 and 4 illustrate the locking operation of a swivel locking system 30, in accordance with some embodiments. When locked, the swivel locking system 30 prevents the seat frame of the seat 100 from swiveling out of the locked orientation until the swivel locking system 30 has been unlocked. The swivel locking system 30 may be locked or unlocked by the passenger using a control lever (not shown in the figures). The swivel locking system 30 of FIGS. 3-4 is similar to that of FIGS. 1 and 2. In FIG. 3, the guide plate 40 has been rotated to a desired angle prior to activating the locking system. For example, a passenger may swivel the seat frame 10 of the seat 100 to a desired orientation, which rotates the guide plate 40 to a corresponding angle. The rotation angle of the guide plate 40 shown in FIG. 3 is arbitrary. As an example, the guide plate 40 may have been rotated from the angle shown in FIG. 2 to the angle shown in FIG. 3, as indicated by the curved arrow. The guide plate 40 may be rotated clockwise or counter-clockwise. In some embodiments, the seat 100 may include stops (not shown in the figures) or other features that limit the range of rotation of the guide plate 40.

In FIG. 4, the swivel locking system 30 is locked by pushing the serrated cart 50 into contact with the internal gear plate 60 such that the pawl teeth 53 mesh with the gear teeth 61, which locks the swivel locking system 30. The meshing of the pawl teeth 53 with the gear teeth 61 prevents rotation of the guide plate 40 and thus prevents rotation of the seat frame 10. When the swivel locking system 30 is locked, any attempt to swivel the seat frame 10 is stopped until the swivel locking system 30 has been unlocked by sliding the serrated cart 50 away from the gear teeth 61. Because the gear teeth 61 are distributed fully around the internal gear plate 60, the swivel locking system 30 may lock the seat frame 10 at any suitable rotated angle of the seat frame 10 for which the pawl teeth 53 are able to mesh with the gear teeth 61. In some embodiments, the seat frame 10 may be locked at angles separated by 3.6°, but other angular spacings are possible. In some embodiments, when the swivel locking system 30 is locked, the serrated cart 50 is held against the internal gear plate 60 by a spring and/or a cam, an example of which is described in greater detail below.

Figure 5:
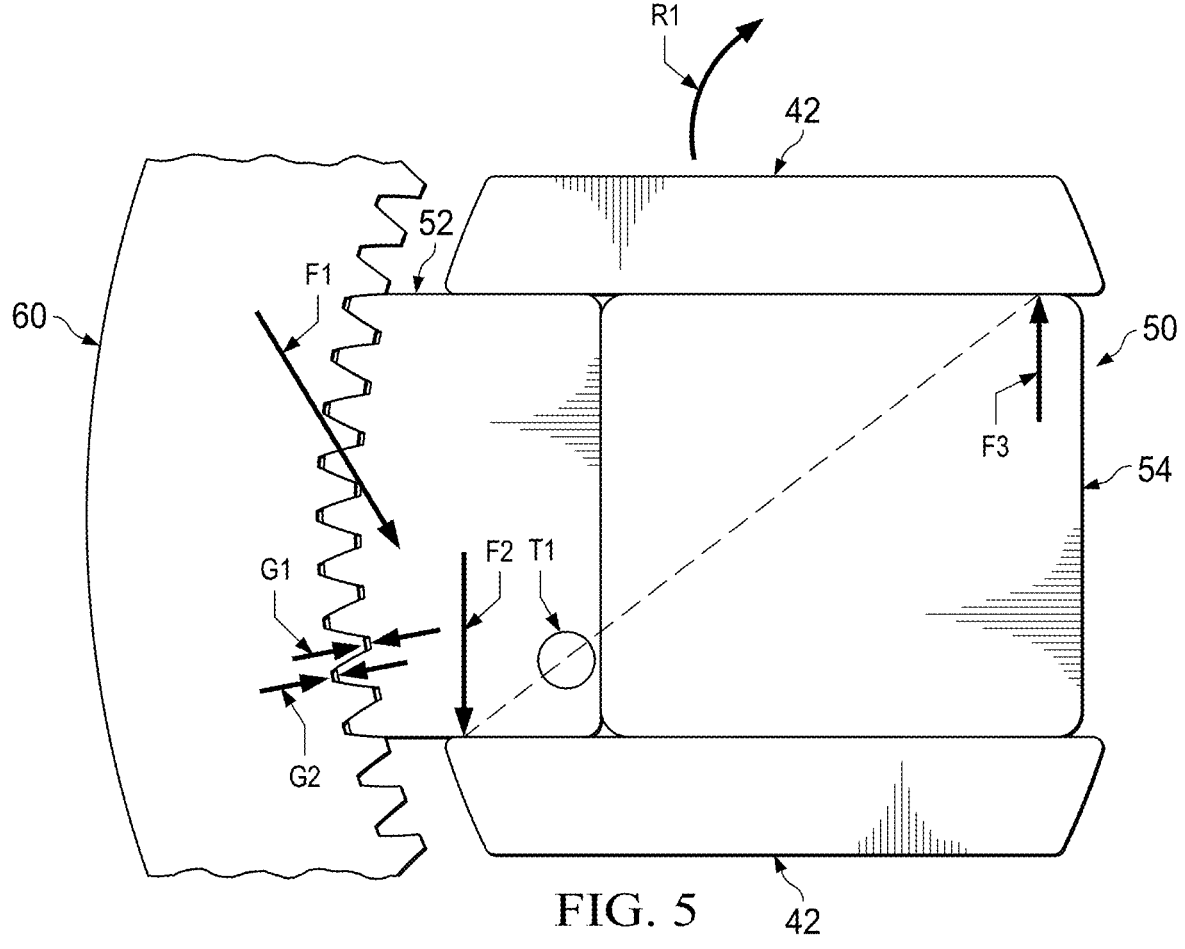
FIG. 5 illustrates a magnified portion of a swivel locking system in a locked state, in accordance with some embodiments.

FIG. 5 illustrates a portion of a swivel locking system 30 in the locked state, in accordance with some embodiments. In particular, FIG. 5 illustrates a serrated cart 50, guide walls 42, and a portion of the internal gear plate 60, which may be similar to those described previously. FIG. 5 is used to illustrate an example of some aspects of the behavior of the swivel locking system 30 when locked, and the various forces and torques indicated in FIG. 5 are for explanatory purposes and may be different in other embodiments or other cases. As discussed above, when the swivel locking system 30 is locked, the pawl teeth 53 of the serrated cart 50 are compressed into the teeth 61 of the internal gear plate 60. The swivel locking system 30 is configured such that, when locked, any rotation of the seat frame 10 imparts perpendicular forces onto the serrated cart 50 (e.g., forces transverse to the linear movement direction of the serrated cart 50) with little or no radial forces imparted onto the serrated cart 50 (e.g., forces parallel to the linear movement direction of the serrated cart 50). These perpendicular forces are transferred to the guide walls 42, as explained in greater detail below.

When an attempt is made to swivel the seat frame 10 while the swivel locking system 30 is locked, the serrated cart 50 attempts to rotate relative to the internal gear plate 60, but the meshed teeth 53/61 prevent rotation of the serrated cart 50. Any rotational force applied to the guide plate 40 results in a torque being applied to the serrated cart 50. Referring to the example of FIG. 5, a rotational force (indicated by arrow R1) on the guide plate 40 results in a force (indicated by arrow F1) being imparted from the internal gear plate 60 to the serrated cart 50. This force F1 attempts to torque the serrated cart 50, but the presence of the guide walls 42 causes the majority of the forces experienced by the serrated cart 50 to be transferred directly from the serrated cart 50 to the guide walls 42. The loads experienced by the guide walls 42 due to the force F1 are concentrated at two opposite regions of the guide walls 42, and may be considered point forces or point loads in some cases. Referring to FIG. 5, the point loads at the guide walls 42 are indicated by arrows F2 and F3. The forces F2/F3 are substantially perpendicular to surfaces of the guide walls 42 (e.g., normal to the guide walls 42), which thus increases the magnitude of the frictional forces that run parallel to the linear movement of the serrated cart 50. These frictional forces help reduce free play and prevent the serrated cart 50 from moving away from the internal gear plate 60.

In some embodiments, the dimensions of the serrated cart 50 and the guide walls 42 are designed to ensure that the majority of the force F1 is transferred to the guide walls 42. For example, the width of the serrated cart 50 and the lengths of the guide walls 42 may determine the locations and magnitudes of the forces F2 and F3. In some cases, the forces F2 and F3 are balanced around a torque point T1, with the forces F2 and F3 being on opposite sides of the torque point T1 and the locations of the force F2, the force F3, and the torque point T1 being approximately colinear. In this manner, the dimensions of the serrated cart 50 and/or the guide walls 42 can determine the magnitude of the forces experienced by the guide walls 42.

As described previously the width of the serrated cart 50 is slightly smaller than the width W1 between the guide walls 42. In some embodiments, the gap between the serrated cart 50 and the guide walls 42 may have a width in the range of about 50 μm to about 70 μm, though other gap widths are possible. In some cases, under relatively large loads (e.g., large force F1), the free play of the swivel locking system 30 may be defined by deformation of the guide walls 42. When the free play of the swivel locking system 30 becomes a function of material deformation of the guide walls 42, the amount of free play can depend on the magnitude of the applied torque. In other words, when loads are large enough to cause material deformation of the guide walls 42, the free play of the swivel locking system 30 can be determined by both the applied torque and the material properties of the swivel locking system 30. The act of deforming the guide walls 42 creates a significant normal force which is translated into friction that prevents the serrated cart 50 from getting pushed away from the internal gear plate 60 and becoming disengaged.

In some cases, the magnitudes of the force F2 and/or the force F3 can depend on the distance of the gap between the internal gear plate 60 and the guide walls 42. For example, in some cases, a smaller gap distance can correspond to a larger distance from the torque point T1 to the point force F2, resulting in a smaller force F2 for a given torque (e.g. a given force F1). Conversely, in some cases, a large gap between the guide walls 42 and the internal gear plate 60 can correspond to a smaller distance from the torque point T1 to the point force F2, resulting in a larger force F2 for a given torque (e.g., a given force F1). In some case of high loading, this relatively larger force F2 can result in the guide walls 42 being sheared off the guide plate 40, overcoming the material strength of the guide plate 40 or guide walls 42 and possibly causing the swivel locking system 30 to fail. In this manner, the torsional forces received by the serrated cart 50 (or the carriage, described below) may depend on the gap distance and on material deformation of the guide walls 42. In some cases, free play may be reduced by preventing the serrated cart 50 from sliding away from the internal gear plate 60 using techniques in addition to friction, some embodiments of which are described below. In this manner, the distance of the gap between the internal gear plate 60 and the guide walls 42 may be controlled to balance forces to reduce free play due to friction and material deformation, but without a significant risk of damage to the swivel locking mechanism 30.

Figure 6:
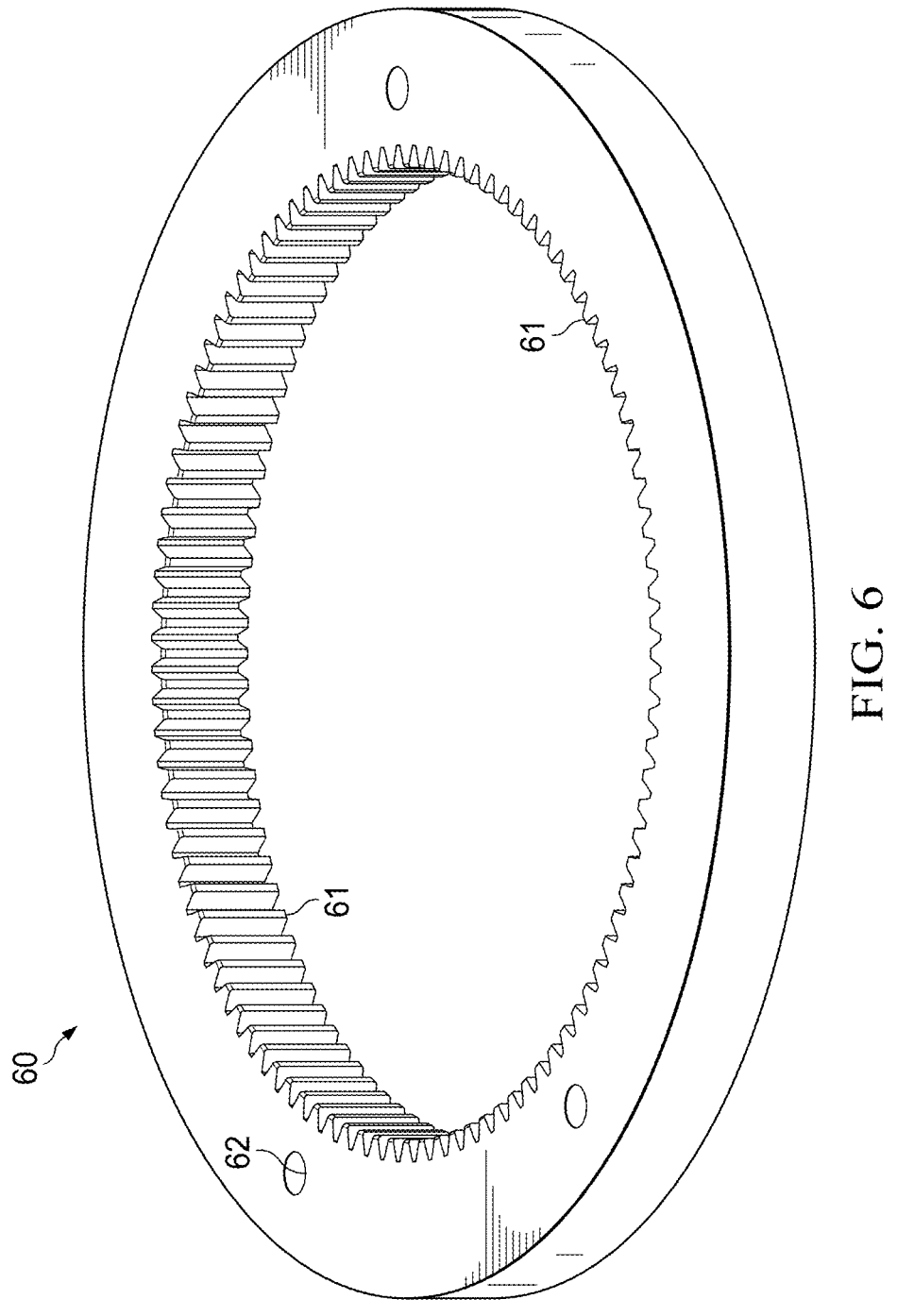
FIG. 6 illustrates a three-dimensional view of an internal gear plate, in accordance with some embodiments.

FIG. 6 illustrates a three-dimensional view of an internal gear plate 60, in accordance with some embodiments. As shown in FIG. 6, the gear teeth 61 are shown as being vertical with vertical sidewalls, but in other embodiments the gear teeth 61 may be helical, oblique, tapered, or have non-vertical sidewalls. In some embodiments, the internal gear plate 60 may have bolt holes 62 used to attach the internal gear plate 60 to the base plate 22 or a component of the base plate 22. The internal gear plate 60 may have other configurations in other embodiments.

Figure 7:
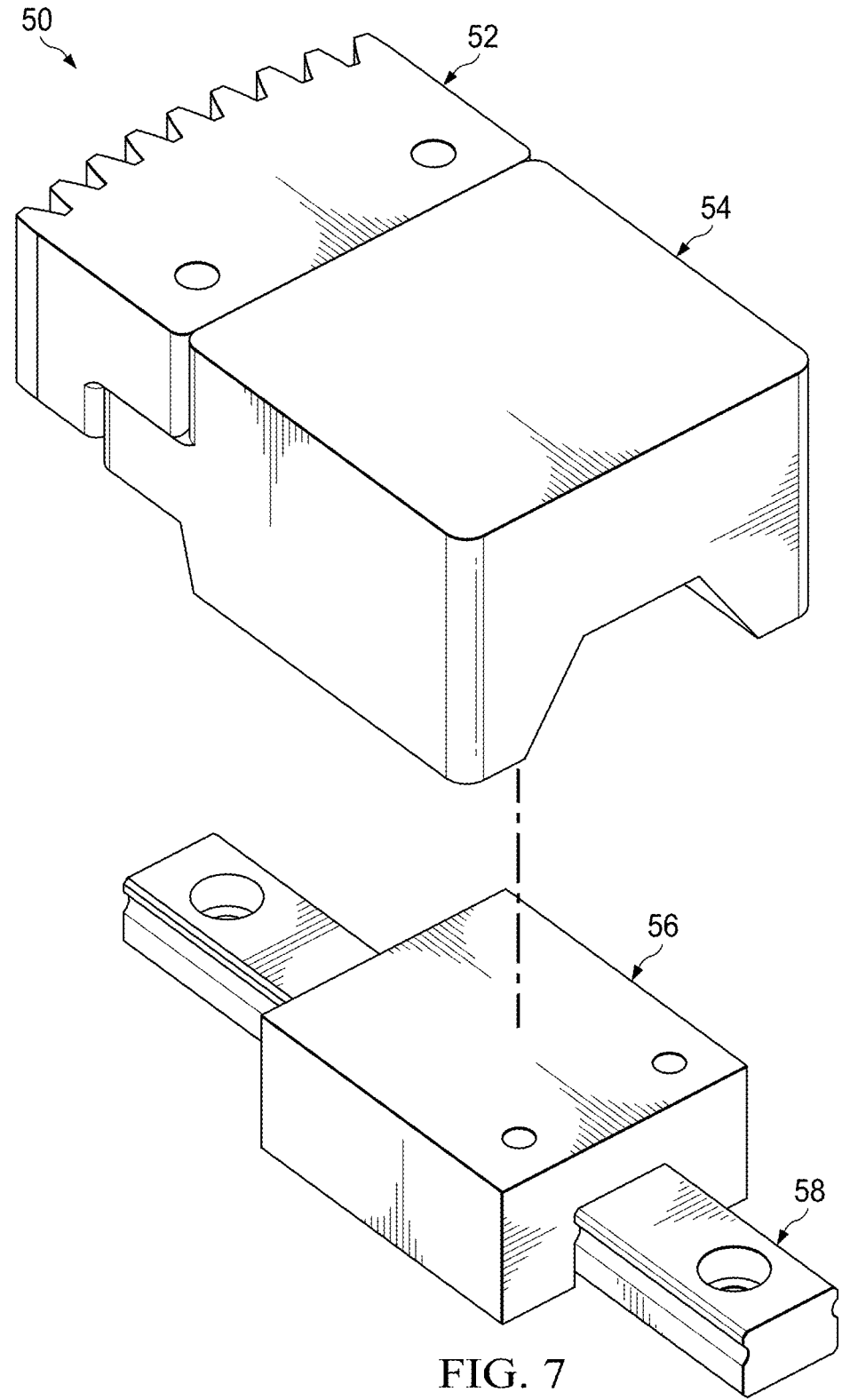
FIG. 7 illustrates a three-dimensional view of a serrated cart, in accordance with some embodiments.
Figure 8:
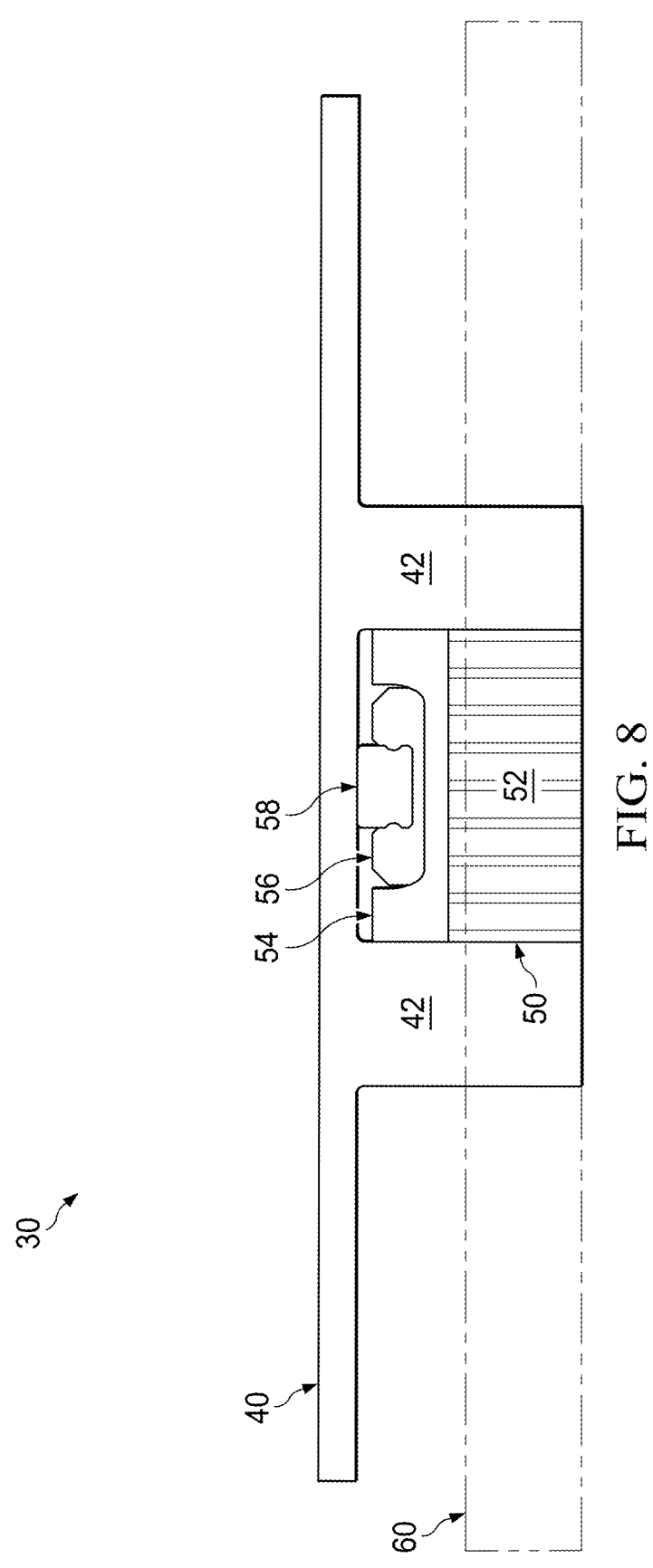

FIG. 7 illustrates a three-dimensional view of a serrated cart 50, in accordance with some embodiments. As described previously, the serrated cart 50 comprises a serrated pawl 52 fixedly attached to a cart body 54. In some embodiments, the cart body 54 is fixedly attached to a carriage 56 that is configured to slide linearly along a rail 58. The rail 58 is fixedly attached to the guide plate 40 (not shown in FIG. 7). In this manner, the serrated cart 50 is secured to the guide plate 40 while also being able to move linearly along the face of the guide plate 40, as described previously. The cart body 54 may be attached to the carriage 56 using bolts or other suitable fasteners, and the rail 58 may be attached to the guide plate 40 using bolts or other suitable fasteners.

In some embodiments, the inner end of the serrated pawl 52 has a stair step shape that mates with a corresponding stair-step shape on the outer end of the cart body 54. The stair-step shape may comprise perpendicular surfaces, in some embodiments. The use of a stair-step design allows for a large contacting surface area between the serrated pawl 52 and the cart body 54, which can provide an efficient distribution of forces transferred between the serrated pawl 52 and the cart body 54. Other designs for the contacting surfaces of the serrated pawl 52 and the cart body 54 are possible. In some embodiments, the carriage 56 and the rail 58 are coupled using ball bearings, which can allow the carriage 56 (and thus the serrated cart 50) to have smooth linear motion along the rail 58 with low resistance. As shown in FIG. 7, in some embodiments, the carriage 56 and the rail 58 have corresponding grooves that help secure the carriage 56 to the rail 58 and reduce free play.

FIG. 8 illustrates a side view of a swivel locking system 30, in accordance with some embodiments. The view of FIG. 8 may be similar to the view indicated in FIG. 4, except that the internal gear plate 60 is shown as "transparent" for clarity. The swivel locking system 30 of FIG. 8 may be similar to other swivel locking systems described herein. FIG. 8 is intended as an illustrative example, and some features may be omitted for clarity. As shown in FIG. 8, in some embodiments, the serrated pawl 52 has a thickness greater than a thickness of the internal gear plate 60, which can reduce material deformation. In other embodiments, the serrated pawl 52 may have a thickness about the same as or less than a thickness of the internal gear plate 60. In some embodiments, surfaces (e.g., bottom surfaces) of the internal gear plate 60, the guide walls 42, and/or the serrated pawl 52 may be approximately level, as shown in FIG. 8. In other embodiments, one or more of the bottom surfaces of the internal gear plate 60, the guide walls 42, and/or the serrated pawl 52 may be vertically offset from another bottom surface. As shown in FIG. 8, the guide walls 42 may have different widths, but the guide walls may have the same width in other embodiments. Other configurations are possible.

Figure 9:
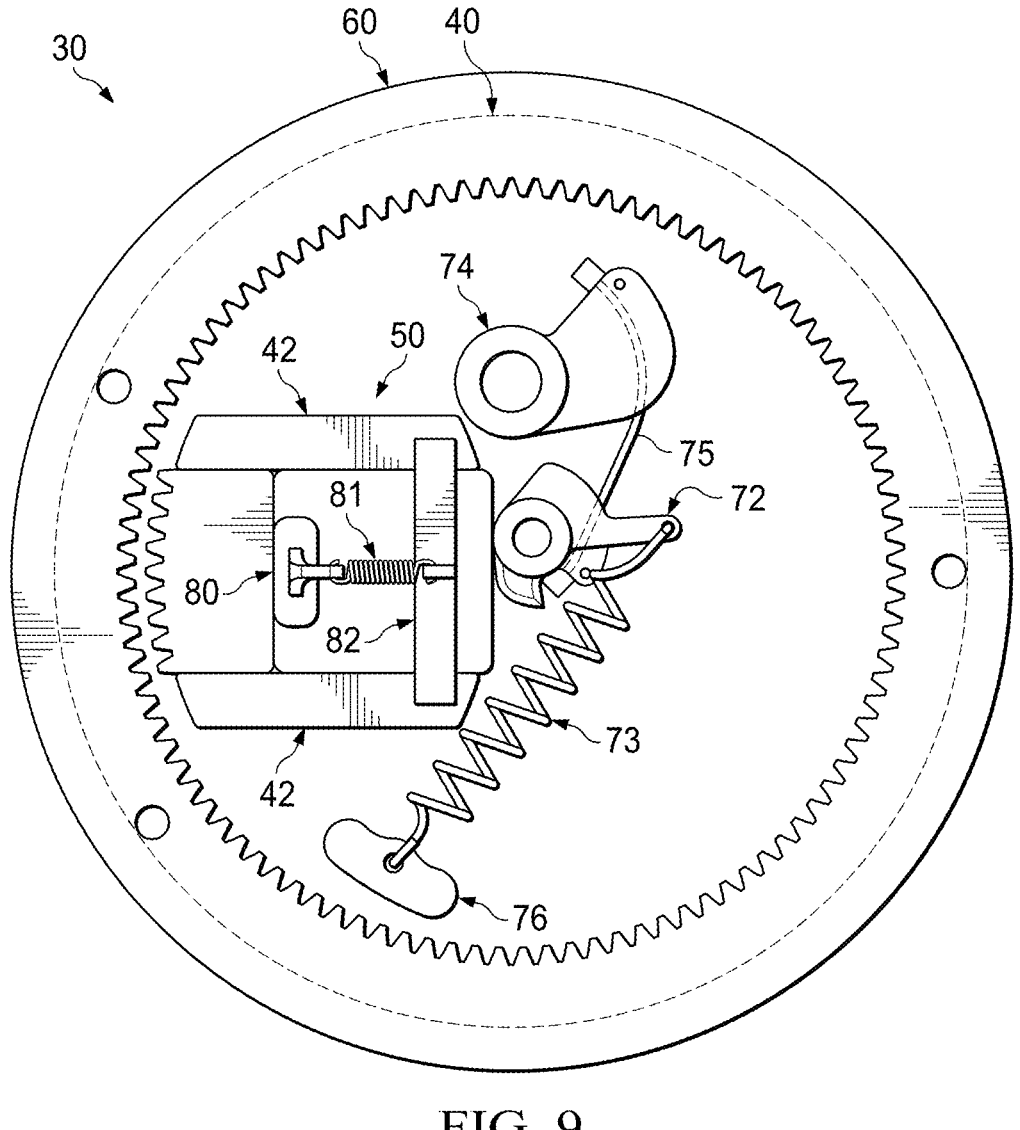
FIG. 9 illustrates a plan view of a swivel locking system in an unlocked state, in accordance with some embodiments.
Figure 10:
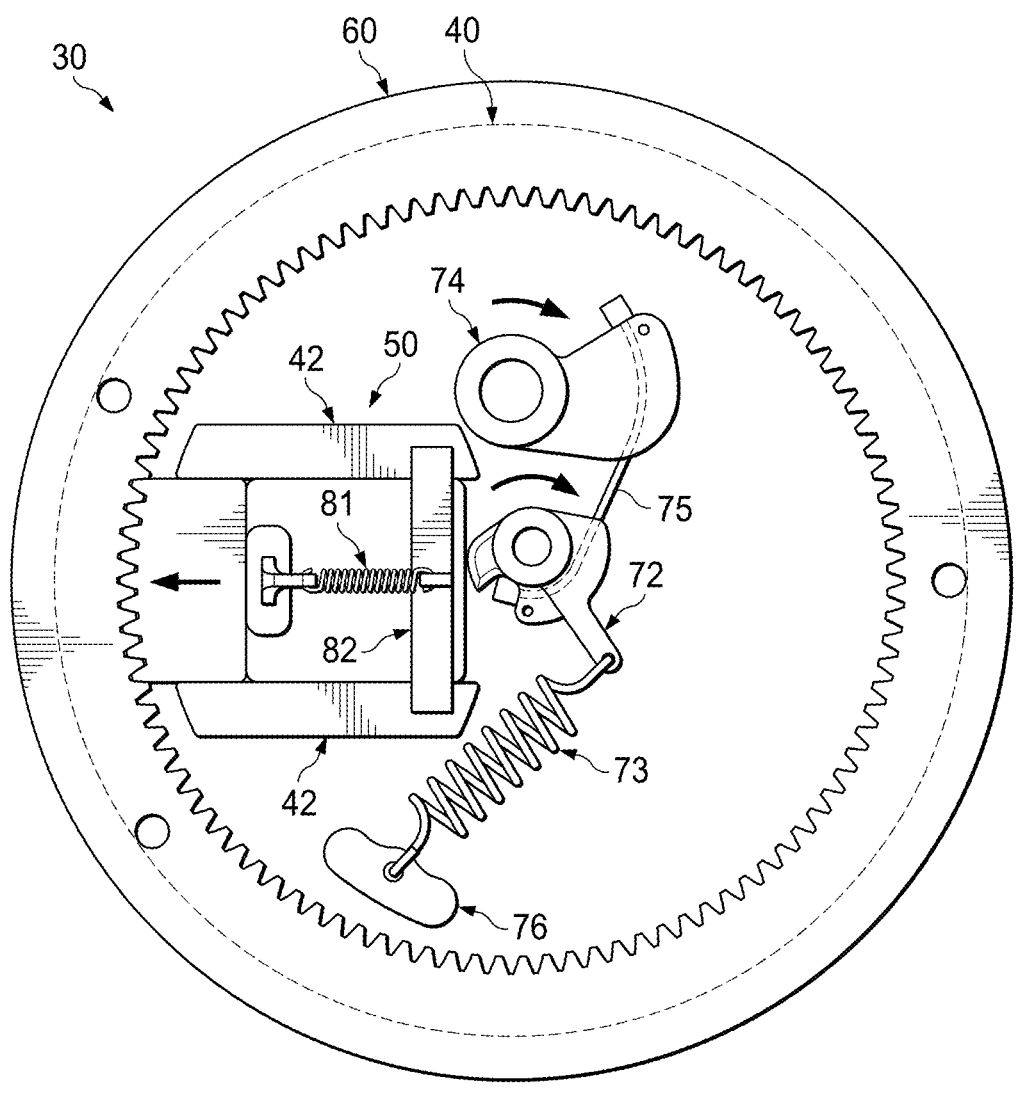
FIG. 10 illustrates a plan view of a swivel locking system in a locked state, in accordance with some embodiments.
Figure 11:
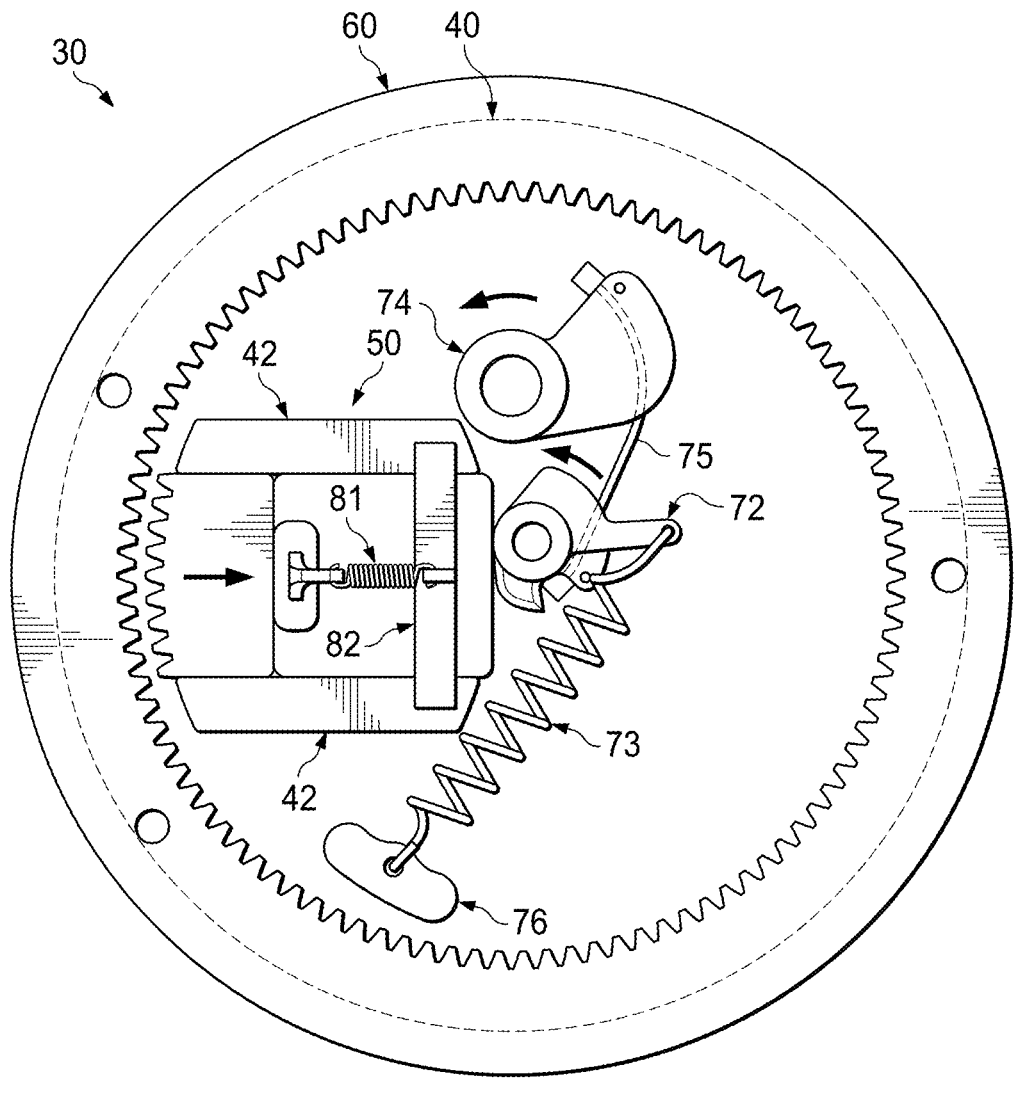
FIG. 11 illustrates a plan view of a swivel locking system in an unlocked state, in accordance with some embodiments.

FIGS. 9, 10, and 11 illustrate a swivel locking system 30 and its operation, in accordance with some embodiments. The swivel locking system 30 is similar to the swivel locking systems described previously, except that FIGS. 9-11 shows components that allow a passenger to lock and unlock the swivel locking system, in accordance with some embodiments. As described in greater detail below, the swivel locking system 30 includes a compression cam 72 that is rotatable to apply a force to the serrated cart 50 that pushes the serrated cart 50 into the internal gear plate 60. A return spring 81 applies a force to the serrated cart 50 that pulls the serrated cart 50 away from the internal gear plate 60 when the compression cam 72 is rotated away from the serrated cart 50. In the views of FIG. 9-11, the compression cam 72 is rotated clockwise to lock the swivel locking system 30 and counter-clockwise to unlock the swivel locking system 30, but the rotation directions may be reversed in other embodiments.

FIG. 9 illustrates the swivel locking system 30 in an unlocked state, in accordance with some embodiments. FIGS. 10 and 11 describe additional detail regarding the locking and unlocking operation of the swivel locking system 30, in accordance with some embodiments. In FIG. 9, the compression cam 72 has been rotated sufficiently counter-clockwise to unlock the swivel locking system 30. The swivel locking system 30 includes a control arm 74 that is rotatably connected through the guide plate 40 to a control lever (not pictured) such that a passenger can operate the control lever to rotate the control arm 74. A portion of the control arm 74 extends away from the rotation axis of the control arm 74 and holds a cable 75 that is attached to the compression cam 72. The compression cam 72 is rotatably connected to the guide plate 40. A portion of the compression cam 72 comprises a variable radius portion. As the compression cam 72 is rotated to lock the swivel locking system 30, an increasing radius of the variable radius portion pushes against the inner end of the serrated cart 50. The use of a variable radius compression cam 72 can allow for efficient transfer of force to the serrated cart 50 and also can reduce backdriving or free play of the serrated cart 50. The compression cam 72 is also attached to one end of a compression spring 73, with the other end of the compression spring 73 being attached to a fixture 76 that is fixedly attached to the guide plate 40. The compression spring 73 exerts a force to rotate the compression cam 72 clockwise. The force of the compression spring 73 is counter-acted by the control arm 74, which, when rotated, pulls on the compression cam 72 via the cable 75 and prevents the compression spring 73 from rotating. In other words, when the control arm 74 pulls on the compression cam 72 to rotate it counter-clockwise, the swivel locking system 30 unlocks, and when the compression spring 73 pulls on the compression cam 72 to rotate it clockwise, the swivel locking system 30 locks.

Still referring to FIG. 9, a return plate 80 is affixed to the top of the serrated cart 50 and a roof plate 82 is affixed to the guide walls 42, in accordance with some embodiments. The return plate 80 may be considered a part of the serrated cart 50, in some cases. The roof plate 82 extends over the serrated cart 50 such that the serrated cart 50 does not contact the roof plate 82 when moving between the guide walls 42. A return spring 81 extends between the return plate 80 and the roof plate 82. When the swivel locking system 30 is locked and the serrated cart 50 is in contact with the internal gear plate 60, the return spring 81 is extended and exerts a force on the serrated cart 50 to pull it away from the internal gear plate 60 and return it to the "unlocked" position. When the compression cam 72 is rotated into the locked position, the variable radius portion of the compression cam 72 blocks the serrated cart 50 and prevents the serrated cart 50 from disengaging despite the return force of the return spring 81. When the compression cam 72 is rotated into the unlocked position, the return spring 81 may pull the serrated cart 50 into contact with the compression cam 72, or the serrated cart 50 may be separated from the compression cam 72.

FIG. 10 illustrates the locking operation of the swivel locking system 30 of FIG. 9, in accordance with some embodiments. From the unlocked configuration of FIG. 9, the passenger locks the swivel locking system 30 by rotating the control arm 74 clockwise. Rotating the control arm 74 clockwise reduces the tension exerted on the compression cam 72 by the cable 75, allowing the compression spring 73 to pull on the compression cam 72 and rotate the compression cam 72 clockwise. As the compression cam 72 is rotated clockwise, the radius of the contacting surface of the compression cam 72 increases, pushing the serrated cart 50 as the radius increases. The return spring 81 exerts a force opposite to that of the pushing force exerted by the compression cam 72, which maintains contact between the serrated cart 50 and the compression cam 72 while not overcoming the force exerted by the compression cam 72. The variable radius portion of the compression cam 72 may be configured to push the serrated cart 50 an appropriate distance to engage the pawl teeth 53 with the gear teeth 61. The shape of the variable radius portion of the compression cam 72 may be configured to efficiently and smoothly push the serrated cart 50 as it rotates.

FIG. 11 illustrates the unlocking operation of the swivel locking system 30 of FIG. 9, in accordance with some embodiments. From the locked configuration of FIG. 10, the passenger unlocks the swivel locking system 30 by rotating the control arm 74 counter-clockwise. Rotating the control arm 74 counter-clockwise increases the tension exerted on the compression cam 72 by the cable 75, allowing the cable 75 to pull on the compression cam 72 and overcome the force exerted by the compression spring 73 to rotate the compression cam 72 counter-clockwise. The shape of the control arm 74 may be configured to efficiently and smoothly pull the cable 75 and rotate the compression cam 72. As the compression cam 72 is rotated counter-clockwise, the radius of the contacting surface of the compression cam 72 decreases, allowing the serrated cart 50 to be pulled toward the compression cam 72 by the return spring 81. This disengages the pawl teeth 53 from the gear teeth 61, which allows the guide plate 40 to rotate freely with respect to the internal gear plate 60.

Figure 12A:
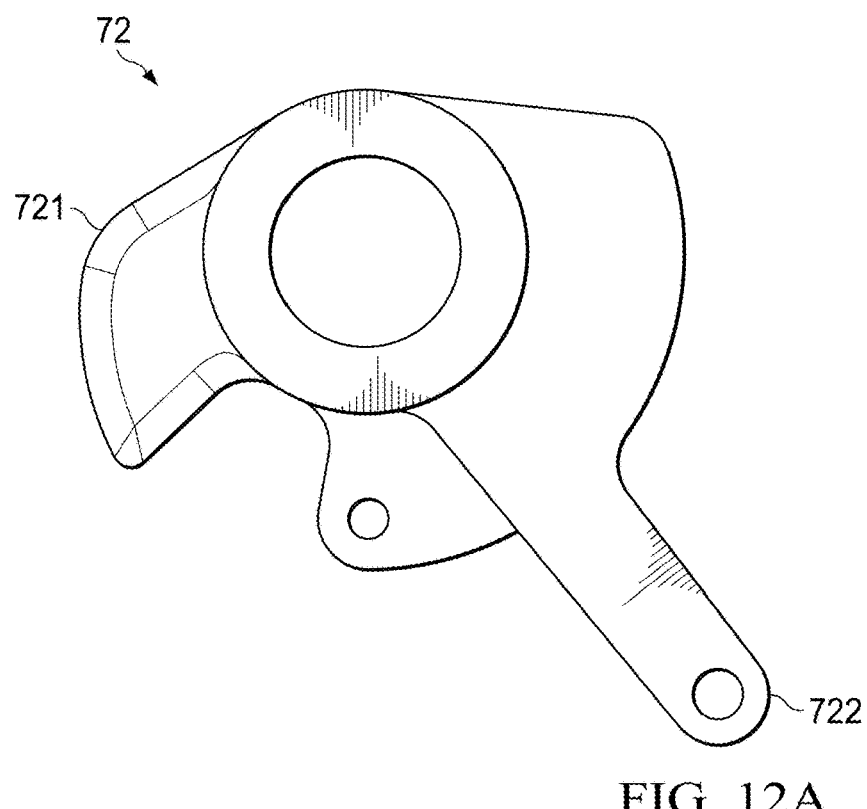
FIGS. 12A and 12B illustrate a plan view and a three-dimensional view of a compression cam, in accordance with some embodiments.
Figure 12B:
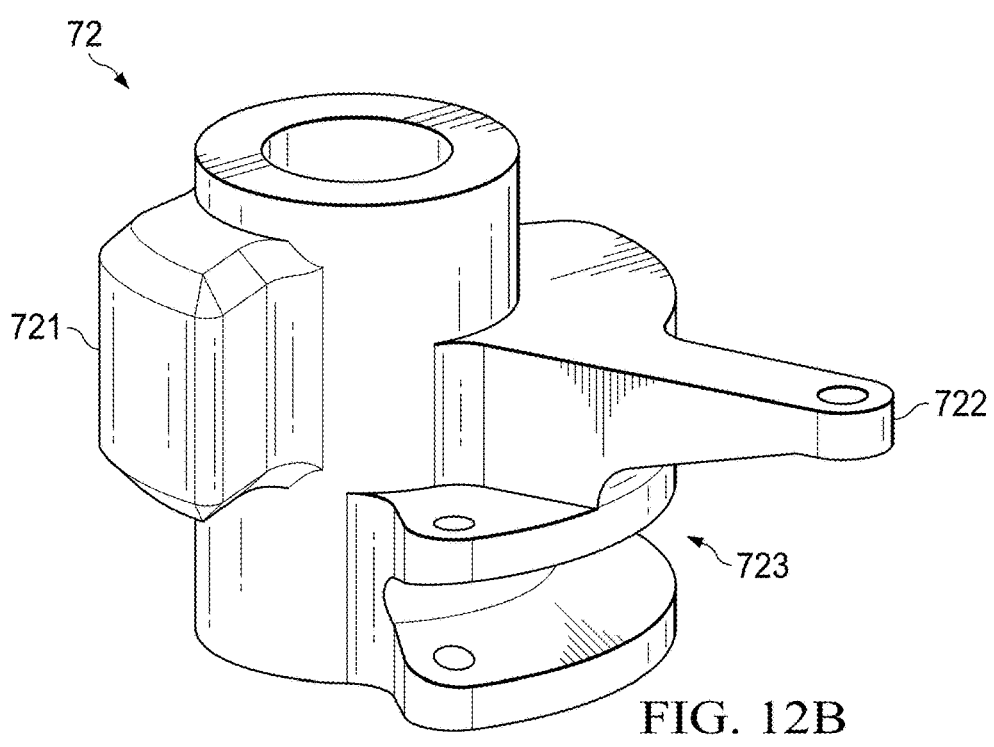

FIGS. 12A and 12B illustrate a plan view and a three-dimensional view of a compression cam 72, in accordance with some embodiments. The compression cam 72 shown in FIGS. 12A-12B may be similar to the compression cam 72 of FIGS. 9-11. The shape of the compression cam 72 shown in FIGS. 12A-12B is an example, and other compression cams 72 are possible. As described previously, the compression cam 72 includes a variable radius portion 721 that protrudes and contacts the serrated cart 50. The compression cam 72 includes a spring arm 722 that protrudes and is connected to the compression spring 73. The spring arm 722 may extend to provide appropriate torque from the compression spring 73 to rotate the compression cam 72. The compression cam 72 also may include a cable groove 723 to secure the cable 75 and allow for appropriate torque to rotate the compression cam 72 due to cable 75 tension. The end of the cable 75 may be affixed to the compression cam 72 at the end of the cable groove 723 by, for example, a pin or the like.

FIGS. 13 through 17 illustrate a swivel locking system 30 that includes lateral compression cams 90, in accordance with some embodiments. The swivel locking system 30 is similar to that described herein, except that the serrated cart 50 includes lateral compression cams 90, and one guide wall 42A includes grooves 421. The grooves 421 may be, for example, recesses, slots, ramps, or the like that are formed in a portion of a sidewall of the guide wall 42A. The lateral compression cams 90 are rotatably connected to the serrated cart 50 and interact with the grooves 421 of the guide wall 42A to provide a lateral force as the serrated cart 50 is pushed toward the internal gear plate 60, described in greater detail below. The lateral forces from the lateral compression cams 90 compress the serrated cart 50 into the opposite guide wall 42B, which reduces the gap between the serrated cart 50 and that guide wall 42B and also increases the frictional forces between the serrated cart 50 and that guide wall 42B. In this manner, forces may be transferred more efficiently between the serrated cart 50 and the guide walls 42A-B, the increased friction may reduce backdriving of the serrated cart 50 when locked, and free play may be reduced. The embodiment shown in FIGS. 13-16 includes two lateral compression cams 90, but more or fewer lateral compression cams 90 may be present in other embodiments.

Figure 13:
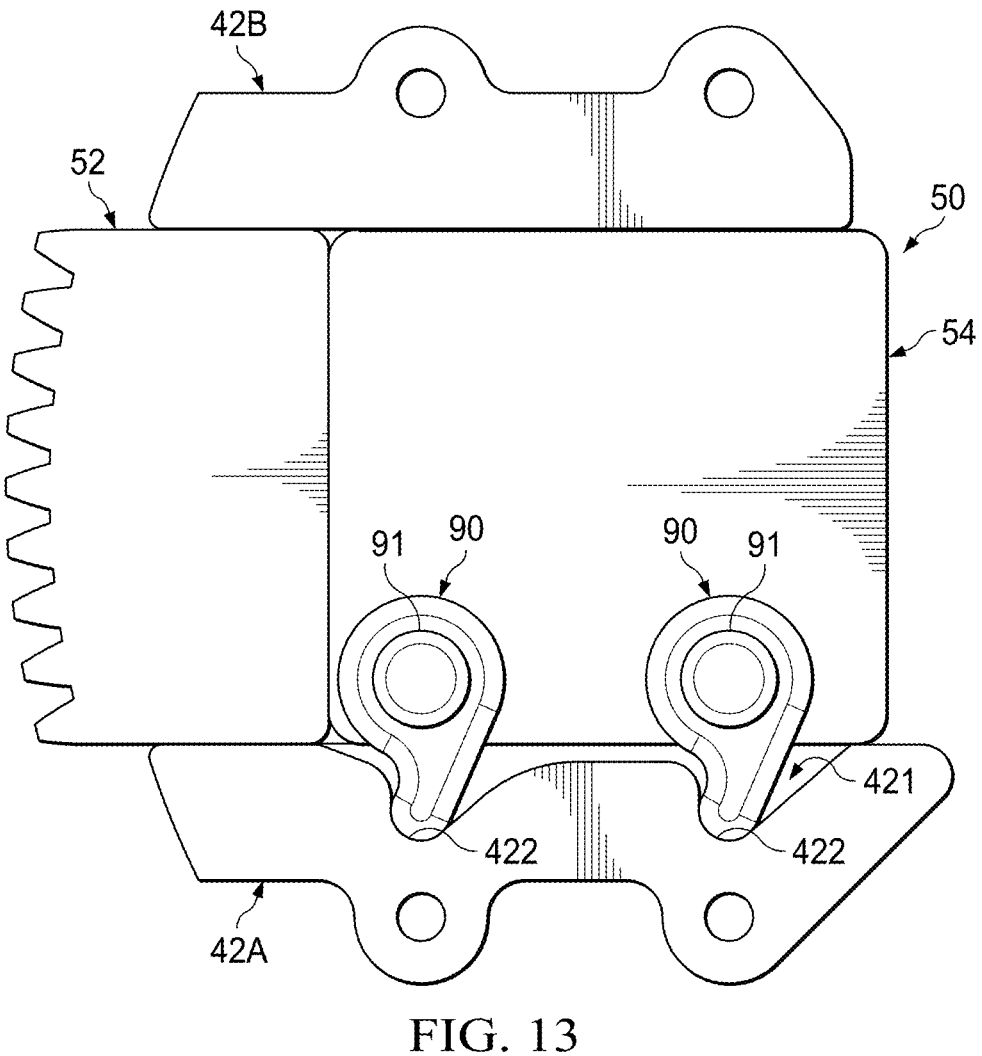
FIG. 13 illustrates a portion of a swivel locking system that includes lateral compression cams, in accordance with some embodiments.

FIG. 13 illustrates a plan view of a serrated cart 50 with lateral compression cams 90, a guide wall 42A with grooves 421, and a guide wall 42B, in accordance with some embodiments. The shapes and configuration of the lateral compression cams 90, the guide walls 42A-B, and the grooves 421 may be different than shown in other embodiments. The lateral compression cams 90 are protruding components that are rotatably connected to the serrated cart 50. For example, in some embodiments, the lateral compression cams 90 may be bushings or the like that encircle and rotate around posts 91. The posts 91 may be part of the cart body 54 or may be attached to the cart body 54, in some embodiments. In some embodiments, the return plate 80 (not shown in FIG. 13) may extend over portions of the lateral compression cams 90 to prevent the lateral compression cams 90 from sliding off the posts 91. In some embodiments, the lateral compression cams 90 are formed of a compressible material (e.g., a metal) to avoid the lateral compression cams 90 becoming jammed or stuck during operation.

The grooves 421 of the guide wall 42A are shaped to receive the protruding portions of the lateral compression cams 90 as the serrated cart 50 is pushed toward the internal gear plate 60. As the serrated cart 50 is pushed toward the internal gear plate 60, the lateral compression cams 90 slide in the grooves 421 toward the internal gear plate 60. The grooves 421 are shaped such that as the pawl teeth 53 mesh with the gear teeth 61, the protruding portions of the lateral compression cams 90 are stopped by stopping surfaces 422 of the grooves 421, causing the lateral compression cams 90 to pivot within the grooves 421 as the serrated cart 50 is further pushed toward the internal gear plate 60. As the lateral compression cams 90 pivot within the grooves 421 at the stopping surfaces 422, they push the serrated cart 50 laterally toward the guide wall 42B and compress the serrated cart 50 against the guide wall 42B. Compressing the serrated cart 50 against the guide wall 42B using the lateral compression cams 90 can lessen the effects of variations in the dimensions of the guide walls 42 and/or the serrated cart 50. For example, by compressing the serrated cart 50 against the guide wall 42B when locked, free play or force transfer is less dependent on the size of the gap between the serrated cart 50 and the guide wall 42B. In some cases, the configuration of the lateral compression cams 90 and the grooves 421 are designed such that the maximum lateral force imparted from the lateral compression cams 90 occurs approximately when the pawl teeth 53 are fully meshed with the gear teeth 61. In some embodiments, the shape of the grooves 421 also limits the separation from the internal gear plate 60 the serrated cart 50 as the lateral compression cams 90 impinge on surfaces when being pulled away from the internal gear plate 60.

Figure 14:
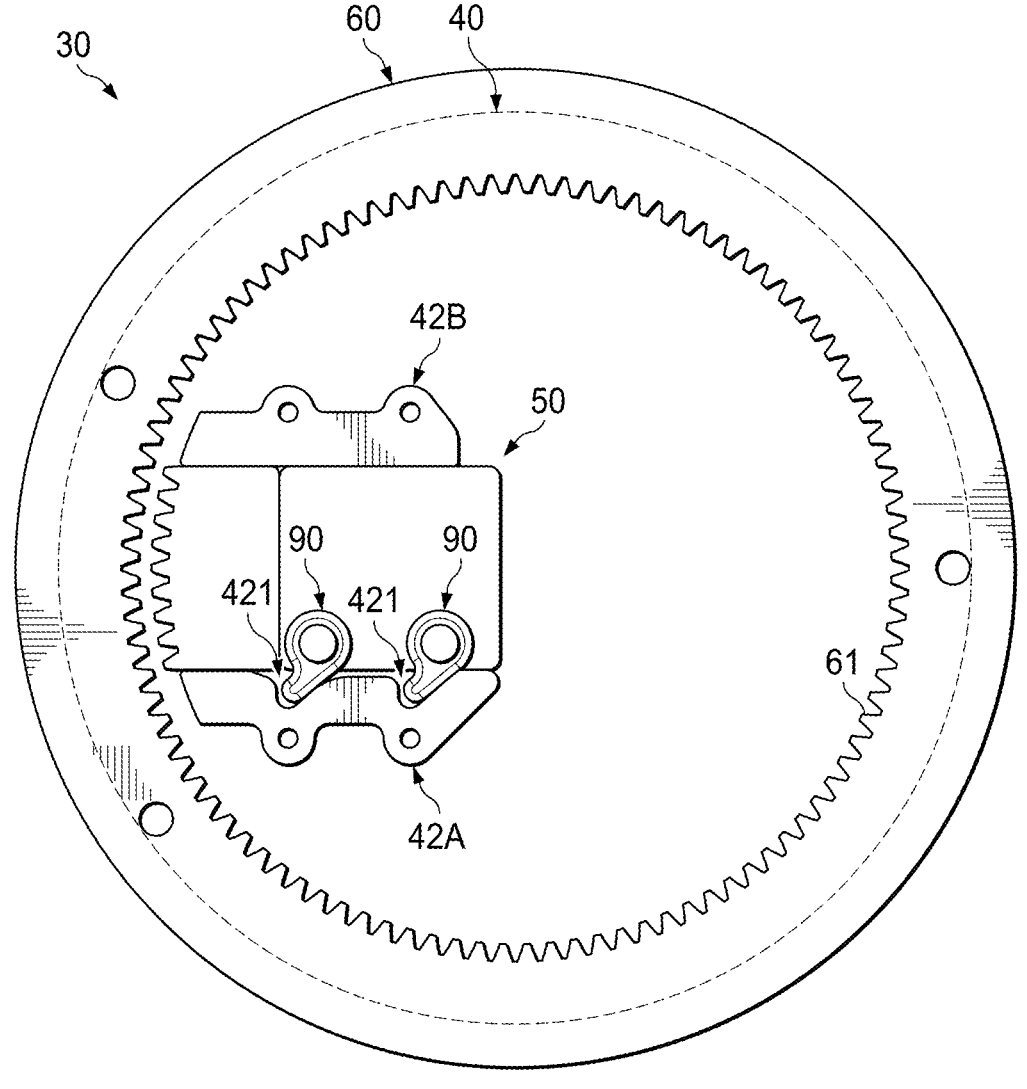
FIGS. 14, 15, and 16 illustrate plan views of a swivel locking system during a locking operation, in accordance with some embodiments.
Figure 15:
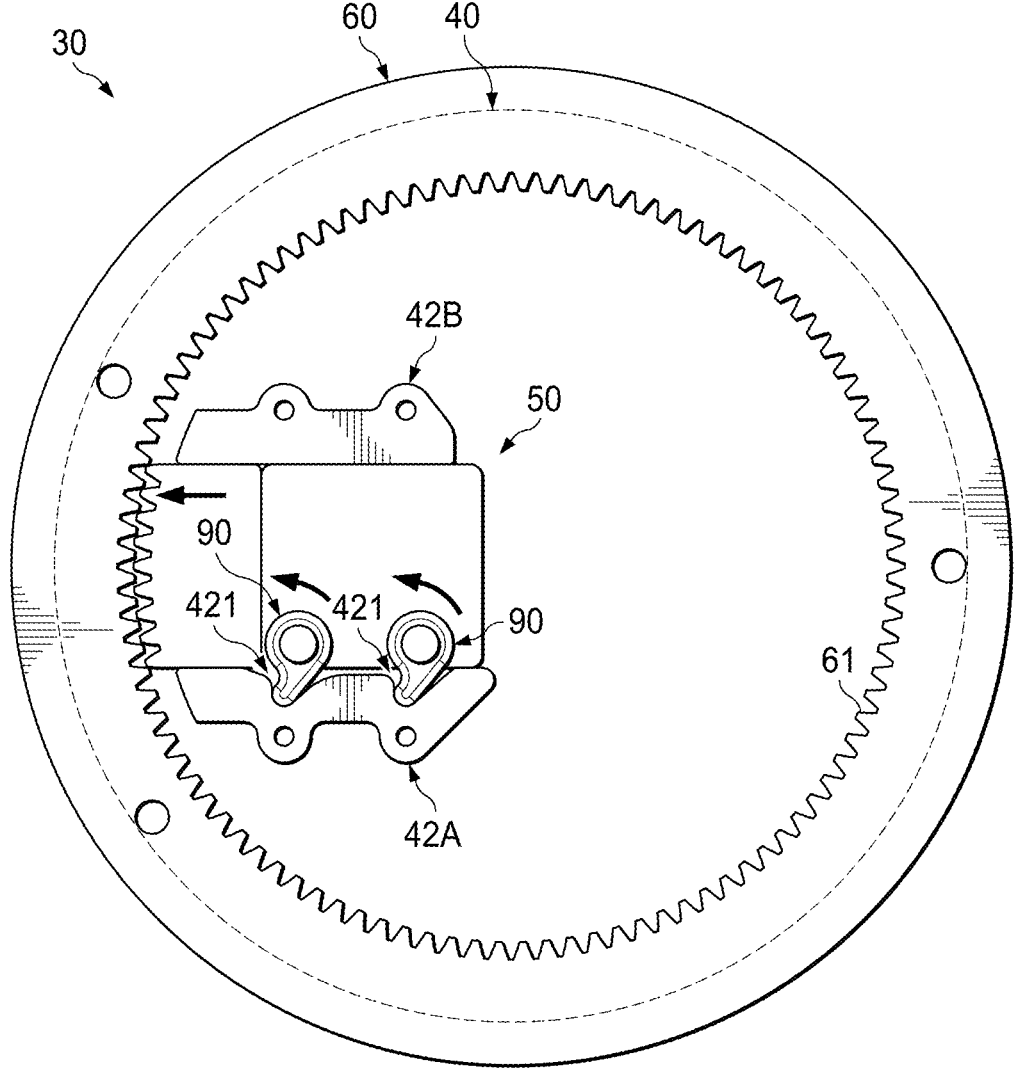
Figure 16:
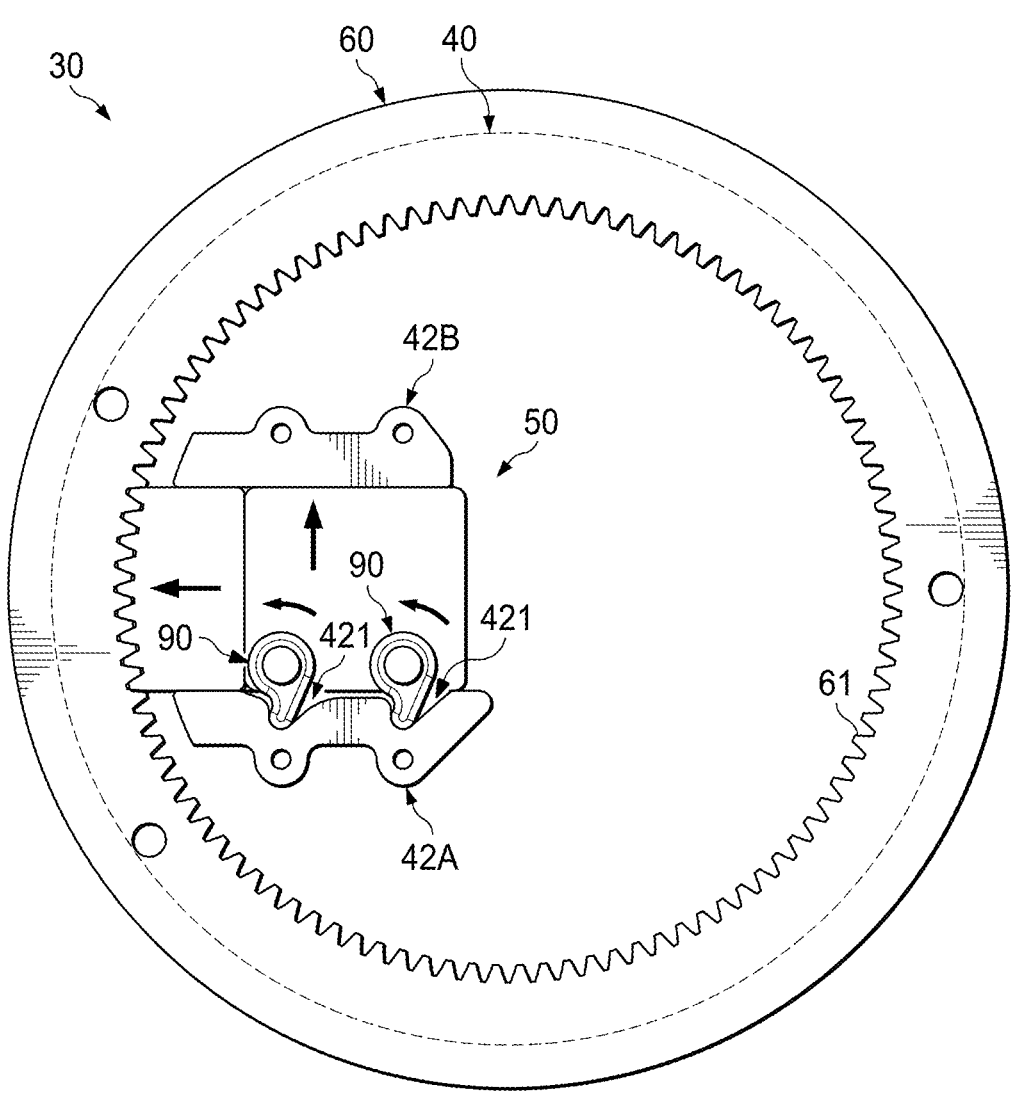

FIGS. 14, 15, and 16 illustrate a locking operation of a swivel locking system 30 with lateral compression cams 90, in accordance with some embodiments. FIG. 14 illustrates the swivel locking system 30 in an unlocked state, in accordance with some embodiments. In FIG. 14, the serrated cart 50 is separated from the internal gear plate 60 and the protruding portions of the lateral compression cams 90 rest within the grooves 421. In this state, the lateral compression cams 90 may be free to rotate slightly, depending on the shape of the grooves 421. In FIG. 15, the serrated cart 50 has been partially pushed toward the internal gear plate 60 (e.g., by the compression cam 72). The lateral compression cams 90 are pushed with the serrated cart 50, and the protruding portions begin to contact the stopping surfaces 422 of the grooves 421. In FIG. 16, the serrated cart 50 has been fully pushed toward the internal gear plate 60. The pushing the serrated cart 50 after the lateral compression cams 90 contact the stopping surfaces 422 cause the lateral compression cams 90 to pivot on the stopping surfaces 422 and lever the serrated cart 50 toward the guide wall 42B, pressing the serrated cart 50 into the guide wall 42B. In this manner, the lateral compression cams 90 allow for more secure and stable locking of the swivel locking system 30.

Figure 17:
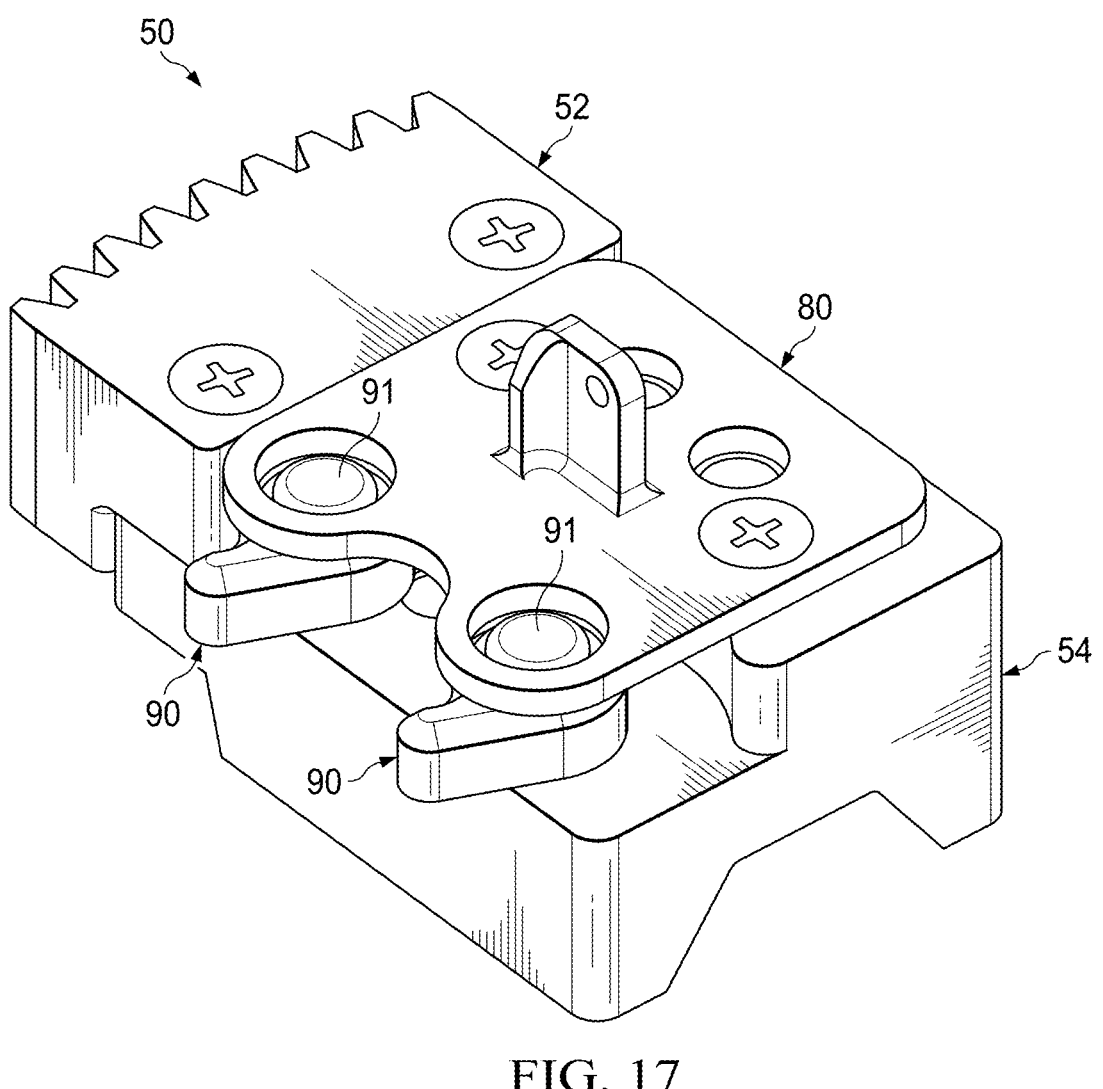
FIG. 17 illustrates a three-dimensional view of a serrated cart with lateral compression cams, in accordance with some embodiments.

FIG. 17 illustrates a three-dimensional view of a serrated cart 50, in accordance with some embodiments. The serrated cart 50 includes lateral compression cams 90, and may be similar to other serrated carts 50 described herein. Other configurations of serrated carts 50 are possible in other embodiments. As shown in FIG. 17, the cart body 54 may include posts 91 that the lateral compression cams 90 encircle. A return plate 80 is affixed to the cart body 54. The return plate 80 provides a fixture for attachment of the return spring 81 and also extends over the lateral compression cams 90 to allow free rotation of the lateral compression cams 90 while holding them in place.

Figure 18:
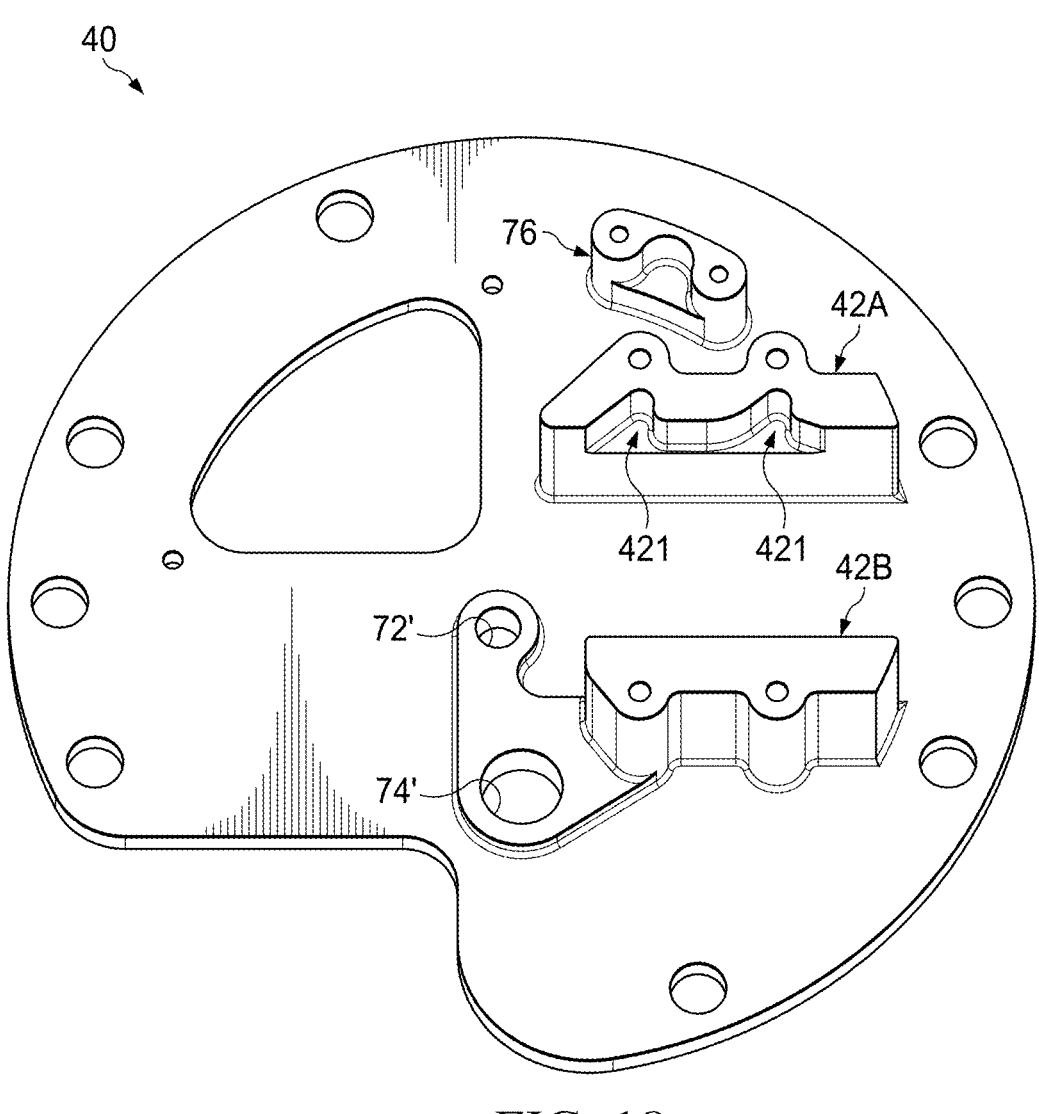
FIG. 18 illustrates a three-dimensional view of a guide plate, in accordance with some embodiments.

FIG. 18 illustrates a three-dimensional view of a guide plate 40, in accordance with some embodiments. The guide plate 40 includes guide walls 42A-B with grooves 421, and may be similar to other guide plates 40 described herein. Other configurations of guide plates 40 are possible in other embodiments. As shown in FIG. 18, the guide plate 40 may have openings to reduce weight and/or allow electrical cables and the like to extend through the guide plate 40. The guide plate 40 includes holes around the perimeter for attachment to the swivel plate 12 using bolts or the like. The guide plate 40 may also include an opening 72' for the compression cam 72 and/or an opening 74' for the control arm 74. The guide plate 40 may also include a fixture 76 for attachment of the compression spring 73.

Figure 19:
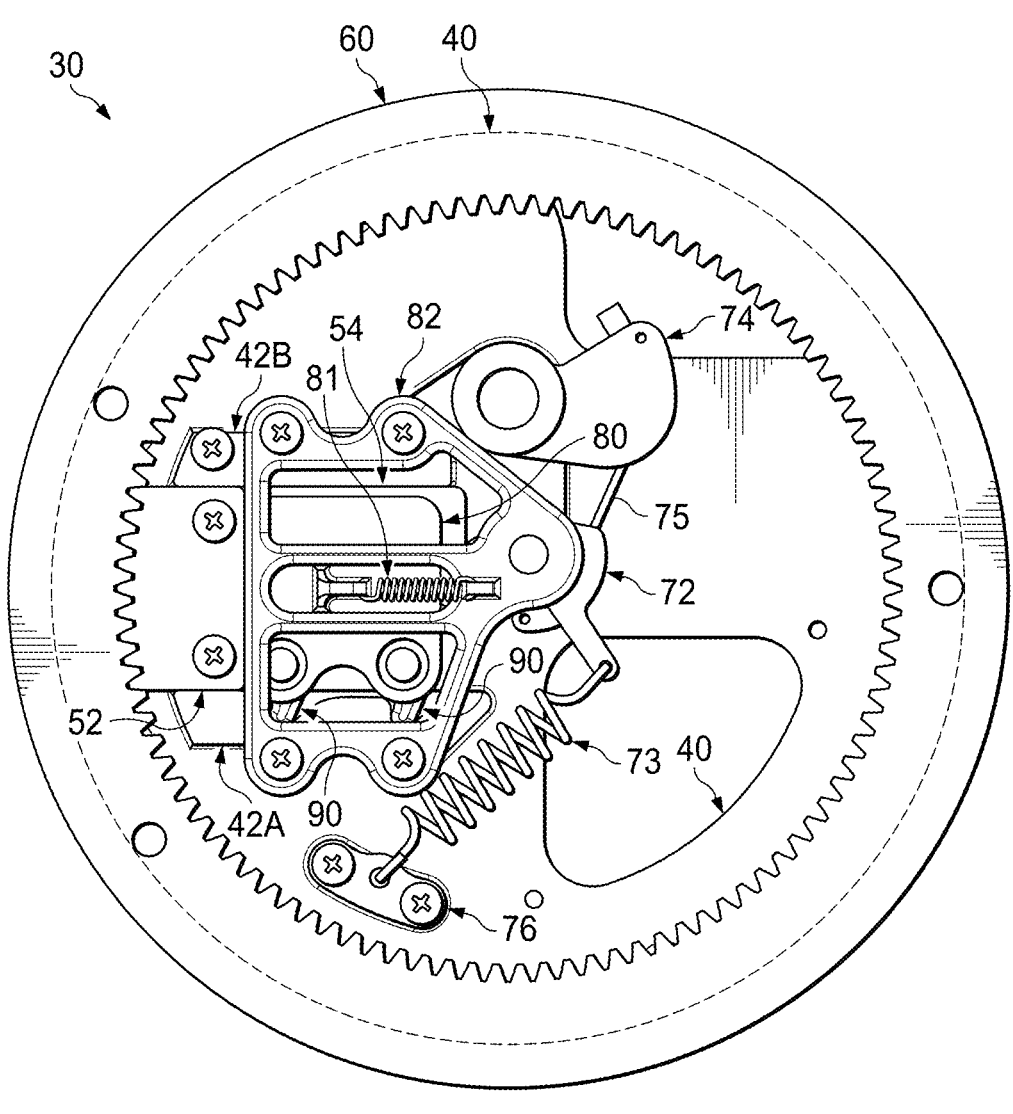
FIG. 19 illustrates a plan view of a swivel locking system in a locked state, in accordance with some embodiments.

FIG. 19 illustrates a plan view of a swivel locking system 30 in a locked state, in accordance with some embodiments. The swivel locking system 30 may be similar to other swivel locking systems described herein, and may have other configurations in other embodiments. As shown in FIG. 19, the swivel locking system 30 may include a roof plate 82 attached to the guide walls 42A-B and the compression cam 72. The roof plate 82 shown in FIG. 19 has one or more openings that allow for the return spring 81 to attach to the return plate 80.

Embodiments herein describe a swivel locking system for an aircraft seat that allows a passenger to lock the orientation of the aircraft seat and prevent swiveling. The swivel locking system described herein allows the passenger to securely lock the orientation of the aircraft seat at finely separated angles around a full 360° of rotation. The swivel locking system described herein has little or no wiggling or free play of the aircraft seat when locked, and also prevents itself from becoming unlocked without direct passenger operation. Further, the swivel locking system described herein may be easier to install than other locking systems. The swivel locking system described herein utilizes a cart with teeth that rotates with the aircraft seat and an internal gear-shaped component that is fixed to the base of the aircraft seat. Upon locking, the teeth of the cart mesh with the teeth of the internal gear-shaped component to prevent locking. The swivel locking systems described herein also efficiently transfer forces between the internal gear-shaped component and the cart to reduce free play and material deformation. Embodiments of the swivel locking system described herein include cams and springs that allow for efficient and secure operation of the swivel locking system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An aircraft seat comprising:
a base frame;
a seat frame rotatably connected to a top side of the base frame, wherein the seat frame is configured to rotate about a vertical axis;
an internal gear plate fixedly connected to the base frame, wherein the internal gear plate comprises a plurality of gear teeth arranged around an opening;
a guide plate fixedly connected to a bottom side of the seat frame, wherein the guide plate comprises a first guide wall and a second guide wall; and
a cart attached to the guide plate between the first guide wall and the second guide wall, wherein the cart comprises a plurality of pawl teeth that are fixedly connected to a sidewall of the cart, wherein the plurality of pawl teeth are configured to mesh with the plurality of gear teeth, wherein the cart is movable along the guide plate to mesh the plurality of pawl teeth with a portion of the plurality of gear teeth.

2. The aircraft seat of claim 1, wherein the first guide wall and the second guide wall protrude into the opening.

3. The aircraft seat of claim 1, wherein the cart is attached to the guide plate by a carriage coupled to a rail, wherein the carriage is fixedly connected to the cart and the rail is fixedly connected to the guide plate.

4. The aircraft seat of claim 3, wherein the rail extends in a radial direction from the vertical axis.

5. The aircraft seat of claim 1 further comprising a roof plate fixedly connected to the guide walls and a first spring extending from the cart to the roof plate.

6. The aircraft seat of claim 1 further comprising a first cam rotatably connected to the guide plate, wherein the cart physically contacts the first cam.

7. The aircraft seat of claim 1, wherein the cart further comprises a second cam rotatably connected to the cart, wherein a sidewall of the first guide wall comprises a groove, wherein a protruding portion of the second cam is within the groove.

8. The aircraft seat of claim 1, wherein the pawl teeth have a vertical thickness that is greater than a vertical thickness of the gear teeth.

9. An aircraft seat comprising:
a base frame;
a base plate attached to an upper side of the base frame;
a seat frame mechanically coupled to the base plate, wherein the seat frame is configured to rotate relative to the base plate about a vertical axis;
a swivel plate fixedly attached to an underside of the seat frame configured to rotate relative to the base plate; and
a swivel locking system, comprising:
an internal gear plate fixedly attached to the base plate, wherein the internal gear plate comprises a plurality of first teeth along an inner sidewall of the internal gear plate;
a guide plate fixedly attached to the swivel plate, wherein the guide plate comprises a first guide wall and a second guide wall;
a rail attached to the guide plate, wherein the rail is between the first guide wall and the second guide wall;
a cart attached to the rail and movable along the rail, wherein a first end of the cart comprises a serrated pawl fixedly attached to the cart, wherein the serrated pawl comprises a plurality of second teeth, wherein the plurality of second teeth faces the plurality of first teeth; and
a variable-radius cam attached to the guide plate and contacting a second end of the cart, wherein the variable-radius cam is configured to, when the variable-radius cam is rotated, push the second end of the cart such that the serrated pawl plurality of first teeth contacts the plurality of second teeth internal gear plate.

10. The aircraft seat of claim 9, wherein the internal gear plate encircles the cart.

11. The aircraft seat of claim 9 further comprising a control arm rotatably attached to the guide plate, wherein the control arm is connected to the variable-radius cam by a cable.

12. The aircraft seat of claim 9 further comprising a first spring connected to the variable-radius cam and the guide plate.

13. The aircraft seat of claim 9, wherein the swivel locking system further comprises a first guide wall at a first side of the cart and a second guide wall at a second side of the cart, wherein the cart is movable with respect parallel to the first guide wall and the second guide wall.

14. The aircraft seat of claim 13, wherein the cart further comprises protruding cams that protrude into corresponding recesses in the first guide wall.

15. An aircraft seat comprising:
a base frame;
an internal gear plate lower member affixed to the base frame, wherein the internal gear plate comprises a recess, wherein the perimeter of the recess comprises a plurality of gear teeth;

a seat frame over the internal gear plate, wherein the seat frame is configured to rotate about a vertical axis;

an upper member guide plate on the internal gear plate lower member, wherein the guide plate is affixed to the seat frame, wherein a bottom surface of the upper member guide plate comprises a first wall and a second wall that protrude from the bottom surface into the recess, wherein an inner surface of the first wall faces an inner surface of the second wall; and a cart attached to the bottom surface of the upper member guide plate, wherein a first sidewall of the cart faces the inner surface of the first wall, wherein a second side-wall of the cart faces the inner surface of the second wall, wherein the cart is between the inner surfaces of the first wall and the second wall, wherein a third first sidewall of the cart comprises a plurality of pawl teeth that fixedly protrude from the third first sidewall, wherein the cart protrudes into the recess, wherein the cart is configured to translate in a direction parallel to the inner surfaces of the first wall and the inner surface of the second wall; and a seat frame on the upper member.

16. The aircraft seat of claim 15, wherein the cart further comprises a lateral compression cam that protrudes toward the inner surface of the first wall.

17. The aircraft seat of claim 15 further comprising a variable-radius cam that contacts a fourth second sidewall of the cart that is opposite the first sidewall.

18. The aircraft seat of claim 15, wherein the recess comprises a plurality of gear teeth that encircle the cart, wherein the plurality of gear teeth are configured to engage with the plurality of pawl teeth.

19. The aircraft seat of claim 15, wherein a length of the cart is greater than a length of the first wall.

20. The aircraft seat of claim 9, wherein the cart is between the vertical axis and the inner sidewall of the internal gear plate.

\* \* \* \* \*